United States Patent
Shirakawa et al.

(10) Patent No.: US 6,273,056 B1
(45) Date of Patent: Aug. 14, 2001

(54) CONTROL SYSTEM FOR DIESEL ENGINE DURING COLD-ENGINE WARM-UP

(75) Inventors: Takashi Shirakawa, Kanagawa; Shuji Kimura, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/205,092

(22) Filed: Dec. 3, 1998

(30) Foreign Application Priority Data

Dec. 15, 1997 (JP) .................................................... 9-345143

(51) Int. Cl.[7] .............................. F02D 41/04; F02D 43/00
(52) U.S. Cl. .................. 123/305; 123/339.1; 123/568.11
(58) Field of Search ........................................ 123/305, 306, 123/406.53, 406.55, 179.5, 491, 339.1, 568.11, 568.12, 568.21

(56) References Cited

U.S. PATENT DOCUMENTS

| | | | |
|---|---|---|---|
| 4,351,297 | * 9/1982 | Suematsu | 123/406.53 |
| 4,433,667 | * 2/1984 | Ripper | 123/571 |
| 4,519,355 | 5/1985 | Fujimura et al. | 123/491 |
| 4,703,733 | * 11/1987 | Fukutomi et al. | 123/406.55 |
| 4,940,032 | * 7/1990 | Fujimoto | 123/406.53 |
| 5,186,139 | 2/1993 | Matsura | 123/301 |
| 5,218,937 | 6/1993 | Matsura | 123/301 |
| 5,327,866 | * 7/1994 | Kitajima | 123/406.55 |
| 5,701,868 | * 12/1997 | Tomisawa | 123/406.53 |

FOREIGN PATENT DOCUMENTS

| | | |
|---|---|---|
| 19534770 | 3/1996 | (DE) . |
| 6-108926 | 4/1994 | (JP) . |
| 8-74676 | 3/1996 | (JP) . |
| 8-86251 | 4/1996 | (JP) . |
| 8-93510 | 4/1996 | (JP) . |
| 10018850 | 1/1998 | (JP) . |
| 11107820 | * 4/1999 | (JP) . |

OTHER PUBLICATIONS

U.S. application No. 09/163,355, Kimura et al., filed Sep. 30, 1998.

* cited by examiner

Primary Examiner—Tony M. Argenbright
Assistant Examiner—Hieu T. Vo
(74) Attorney, Agent, or Firm—Foley & Lardner

(57) ABSTRACT

A diesel engine comprises a combustion-temperature control device for adjusting a combustion temperature of the engine depending on an engine operating condition, and an ignition-delay-duration control device for adjusting an ignition delay duration depending on the engine operating condition. An engine-temperature sensor is provided for detecting an engine temperature. During cold-engine warm-up period, an electronic control unit effectively compensates for both the combustion temperature and the ignition delay duration depending on the engine temperature, to reconcile the slow initial combustion in the early combustion stage and the sharp combustion in the middle or later combustion stage and so as to realize a so-called low-temperature premixed combustion with an increased rate of premixed combustion to diffusion combustion under a condition of low combustion temperatures.

12 Claims, 20 Drawing Sheets

1 : PRESENCE OF WATER-TEMP. DEPENDENT
    SWIRL CONTROL VALVE OPENING CORRECTION

2 : ABSENCE OF WATER-TEMP. DEPENDENT
    SWIRL CONTROL VALVE OPENING CORRECTION

CONTROL SYSTEM FOR DIESEL ENGINE DURING COLD-ENGINE WARM-UP

The contents of Application No. TOKUGANHEI 9-345143, filed Dec. 15, 1997, in Japan is hereby incorporated by reference.

BACKGROUND OF THE INVENTION

1. Field of the Invention

The present invention relates to a system for electronically controlling a diesel engine during the cold-engine warm-up period, and specifically to a diesel-engine control system capable of reconciling slow initial combustion (slow early-stage combustion) and sharp middle-stage combustion, while controlling both a combustion temperature and an ignition delay duration of diesel fuel injected into the combustion chamber even during the cold-engine warm-up period.

2. Description of the Prior Art

In Diesel engines, when the combustion temperature is properly reduced by application of heavy exhaust gas recirculation (EGR) to reduce $NO_x$ (nitrogen oxides) emissions, the ignition delay duration between the start of fuel-injection and the start of ignition tends to be increased. As a result of this, the combustion temperature drops and additionally the combustion rate of the latter stage of the power stroke to the former stage increases. Also, owing to the increased ignition delay duration, some places in the engine cylinders lack a sufficient supply of oxygen. This results in the formation of particulate matter (PM) and produces unburned fuel (unburned HCs) and unburned gases such as carbon monoxide (CO). To improve such a trade-off relationship between the reduced $NO_x$ emissions and the increased particulate matter (soot that causes black smoke in the exhaust) and unburned HC and CO, recently, there has been proposed and developed a new combustion concept with respect to a conventional in-cylinder direct-injection diesel engine. In order to suppress the formation of $NO_x$ emissions and to simultaneously reduce PM (smoke), Japanese Patent Provisional Publication No. 8-86251 teaches the ignition-delay-duration control and the use of strong swirl. According to the Japanese Patent Provisional Publication No. 8-86251, the ignition delay duration is positively increased by lowering the combustion temperature depending on engine operating conditions, and additionally strong swirl motion is produced in the combustion chamber, so as to simultaneously reduce both $NO_x$ emissions and particulate matter (smoke). When the combustion temperature drops, $NO_x$ density can be reduced. At this time, if the ignition delay duration is increased, the exhaust smoke density can be reduced by virtue of the generation of swirl motion. As is generally known, the combustion process of a usual diesel engine comprises a premixed combustion duration (an initial combustion duration corresponding to the early stage of the combustion process) where the air-fuel mixtures premixed during the ignition delay duration rapidly burn and thus combustion takes place all at once, raising the combustion temperature, and a diffusion combustion (a main combustion often called a controlled combustion duration) where the burning velocity is limited by the diffusion rate of the diesel fuel and air and also the diffusion combustion is controlled depending on the rate of fuel injection, since the mixture is combusted as the fuel is injected. On diesel engines, the diffusion combustion follows the premixed combustion. The premixed combustion tends to produce little soot, as compared with a conventional diffusion combustion. As discussed above, in the case that swirl motion is created in the combustion chamber in addition to the positively increased ignition delay duration, such a swirl motion promotes mixing of the air and the fuel spray injected from the fuel injector nozzle. Owing to both the positively increased ignition delay period based on the combustion-temperature drop and the generation of the strong swirl motion, more of the combustion process tends to become the premixed combustion. This suppresses the formation of soot that causes black smoke in the exhaust.

Just after the engine starts to run, the engine, the combustion chamber, and the diesel fuel are all cold. During the initial warm-up period (or during cold engine operation), the ignition delay duration between the start of injection and the start of ignition is extended, and thus combustion is retarded. This results in the generation of white smoke (increased unburned hydrocarbon emissions in the exhaust) and also the combustion is apt to become unstable. To avoid this, in conventional diesel engines, generally, the fuel-injection timing is often advanced during the cold engine operation.

Japanese Patent Provisional Publication Nos. 6-108926 and 8-74676 disclose another control methods for exhaust-gas recirculation (EGR) amount to reduce exhaust emissions and to enhance driveability during the cold engine operation or during the engine warm-up period. The Japanese Patent Provisional publication No.6-108926 teaches the adjustment of an intake throttle opening based on the engine coolant temperature. On the other hand, the Japanese Patent Provisional publication No. 8-74676 teaches the adjustment of an exhaust-gas recirculation (EGR) valve opening based on the engine coolant temperature.

In general, diesel engines have the advantage of more superior fuel economy in comparison with spark-ignition gasoline engines, and particularly have the advantage of a high thermal efficiency at partial loads. In other words, specifically in direct-injection diesel engines, there is less heat being lost to the engine coolant, thus deteriorating the heating performance (or the warming-up performance) during the cold-engine operation, than in spark-ignition gasoline engines. To avoid the heating performance from being lowered during the cold-engine warm-up period in diesel engines, Japanese patent Provisional Publication No. 8-93510 teaches the adjustment of an exhaust-gas temperature. In the heater device disclosed in the Japanese patent Provisional Publication No. 8-93510, the exhaust temperature is adjusted by way of movement of the exhaust throttle valve depending on the engine operating conditions, and whereby the heating performance can be enhanced without undesirably increasing the exhaust smoke density.

In recent years, it is necessary to simultaneously reduce both $NO_x$ emissions and particulate matter (PM) for example smoke, from the viewpoint of exhaust-emission purification. That is, it is necessary to further reduce exhaust emissions produced during the cold-engine warm-up period. However, if the injection timing is compensated for such that the timing is advanced in order to prevent reduction in the driveability and generation of white smoke (unburnt hydrocarbons), in lieu of thereof $NO_x$ emissions are built up to a high level.

When reduction in $NO_x$ emissions is attempted with the increased EGR amount during the cold-engine warm-up period in the same manner as after the engine warm-up. the engine is apt to misfire owing to an increased cooling loss arisen from a lower engine-cylinder wall temperature than with after the engine warm-up period. This results in unstable combustion in the engine cylinder. Also, there is a possibility of the white smoke formation and the generation of nasty smell.

Furthermore, according to the combustion concept disclosed in the Japanese Patent Provisional Publication No. 8-86251, in the case that the ignition delay duration of the fuel injected into the combustion chamber is prolonged under low engine coolant temperatures with the combustion temperature dropped, the premixed combustion rate increases. Thus, there is a tendency for white smoke caused by unburnt fuel and/or soluble organic substance (SOF) contained in the particulate matter (PM) to increase.

Moreover, when the intake throttle opening and/or the exhaust throttle opening are adjusted for the purpose of improvement of heating performance during cold-engine operation, there is a possibility that the smoke emission density, such as white smoke or black smoke, increases. This deteriorates the stability of the engine under particular engine operations, for example during lower engine loads. The rising of the exhaust-gas temperature achieved through adjustment of the intake throttle opening and/or the exhaust throttle opening means deterioration in fuel consumption. Therefore, it is desirable to enhance the heating performance without deteriorating the fuel economy. Generally, there is a tendency for friction loss of the engine to increase during the cold engine operation or during the warm-up period. Thus, it is desirable to rapidly complete the engine warm-up operation so as to reduce both fuel consumption and exhaust emissions.

SUMMARY OF THE INVENTION

Accordingly, it is an object of the invention to provide a diesel-engine control system during the cold-engine warm-up period, which avoids the aforementioned disadvantages of the prior art.

It is another object of the invention to provide an improved diesel-engine control system, which is capable of reconciling reduction in exhaust emissions, prevention in white smoke, and enhancement in engine stability (stable combustion) during the cold-engine warm-up period, and simultaneously capable of enhancing the heating performance during the cold-engine warm-up period.

In order to accomplish the aforementioned and other objects of the present invention, a diesel engine comprises a combustion-temperature control device for adjusting a combustion temperature of the engine depending on an engine operating condition, an ignition-delay-duration control device for adjusting an ignition delay duration depending on the engine operating condition, a sensor for detecting an engine temperature, a combustion-temperature compensator for compensating for the combustion temperature, during a cold-engine warm-up period, depending on the engine temperature, and an ignition-delay-duration compensator for compensating for the ignition delay duration, during the cold-engine warm-up period, depending on the engine temperature, whereby a rate of premixed combustion to diffusion combustion increases under a condition of low combustion temperatures. Preferably, the combustion-temperature control device comprises an exhaust gas recirculation system. On the other hand, it is preferable that the ignition-delay-duration control device comprises a fuel-injection timing adjustment device. Alternatively, the combustion-temperature control device and the ignition-delay-duration control device both may comprise an exhaust-gas-recirculation gas cooling device for cooling part of exhaust gases sent back through the engine. The diesel engine may further comprise a swirl generating device for generating a controlled swirl flow in a combustion chamber of the engine, and a swirl-intensity compensator for compensating for a swirl intensity of the controlled swirl flow depending on the engine temperature. Preferably, the previously-noted sensor may comprise a water-temperature sensor for detecting a temperature of engine coolant. The swirl-intensity compensator may enlarge a rate of a high-level swirl zone to a low-level swirl zone by varying a boundary line between the high-level swirl zone and the low-level swirl zone, when the engine temperature is below a predetermined temperature value, and also the boundary line is based on engine speed and load. The swirl-intensity compensator may comprise an engine speed sensor for detecting engine speed and an engine load sensor for detecting engine load, and it is preferably that the high-level swirl zone is enlarged and the low-level swirl zone is contracted by making a downward correction to an engine speed data detected by the engine speed sensor by a first correction factor and by making a downward correction to an engine load data detected by the engine load sensor by a second correction factor.

According to another aspect of the invention, an electronic control system for a direct-injection diesel engine having a combustion-temperature control device for adjusting a combustion temperature of the engine depending on an engine operating condition, and an ignition-delay-duration control device for adjusting an ignition delay duration depending on the engine operating condition, the electronic control system comprises an engine temperature detection means for detecting an engine temperature, a combustion-temperature compensation means for compensating for the combustion temperature adjusted by the combustion-temperature control means, during a cold-engine warm-up period, depending on the engine temperature, and for generating an engine-temperature dependent combustion-temperature control command, so that the combustion temperature is feedback controlled in response to the engine-temperature dependent combustion-temperature control command, and an ignition-delay-duration compensation means for compensating for the ignition delay duration, during the cold-engine warm-up period, depending on the engine temperature, and for generating an engine-temperature dependent ignition-delay-duration control command, so that the ignition delay duration is feedback controlled in response to the engine-temperature dependent ignition-delay-duration control command, whereby a rate of premixed combustion to diffusion combustion increases under a condition of low combustion temperatures.

DESCRIPTION OF THE PREFERRED EMBODIMENTS

Figure 4:
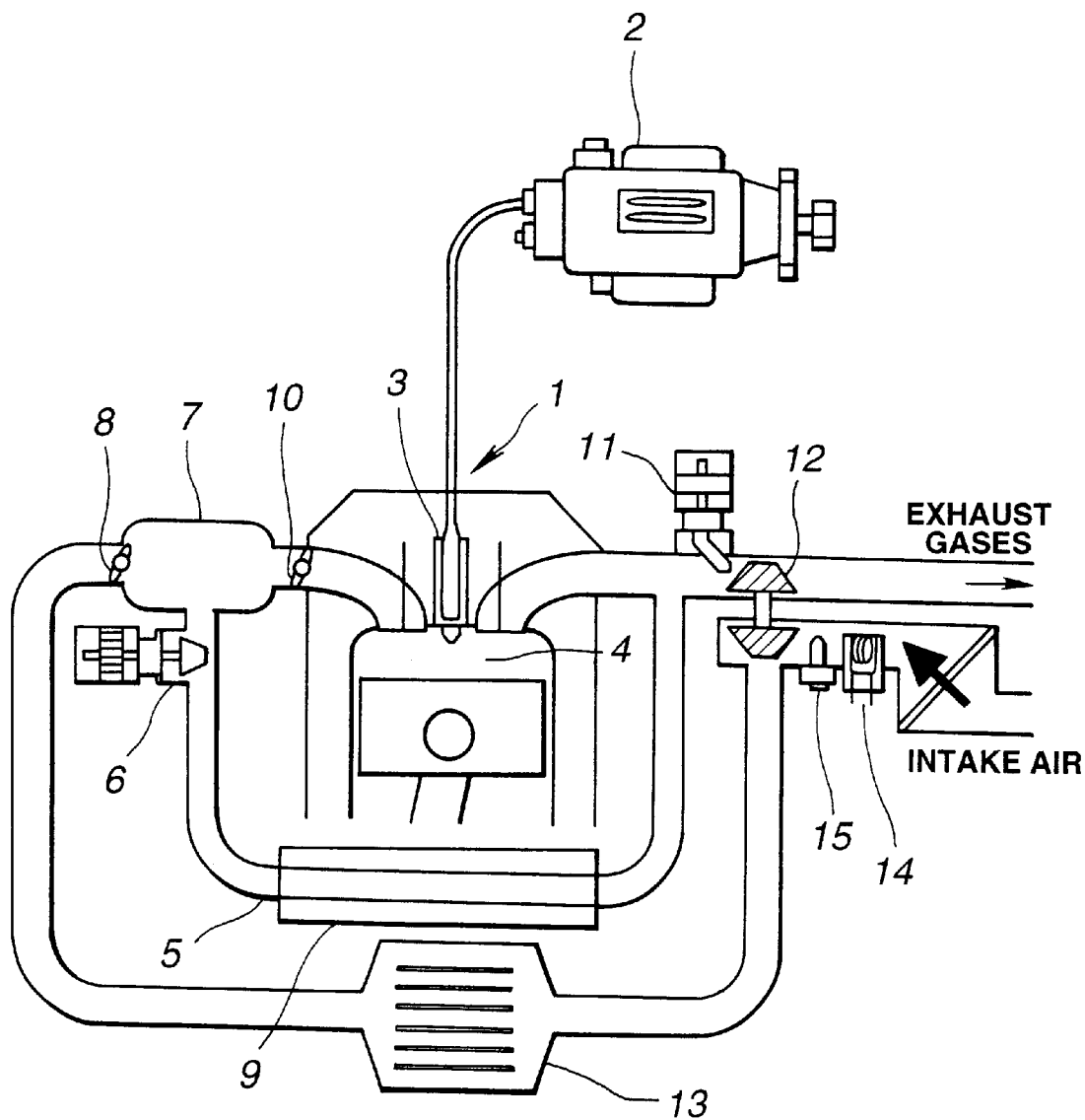
FIG. 4 is a system diagram illustrating the embodiment of a direct-injection diesel engine according to the invention.
Figure 5:
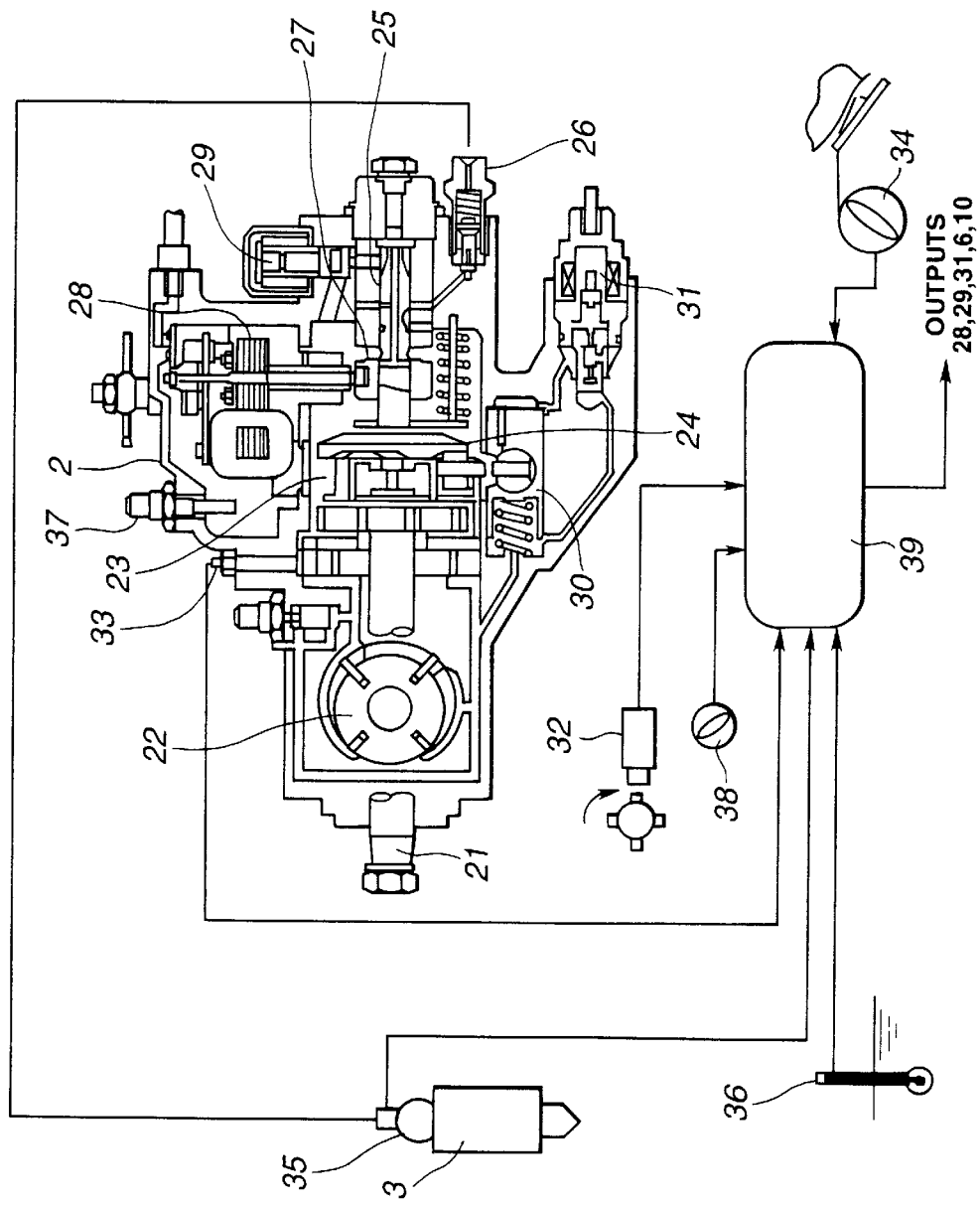
FIG. 5 shows one example of a fuel injection device applicable to the direct-injection diesel engine of the invention.

Referring now to the drawings, particularly to FIG. 4, the direct injection diesel engine of the embodiment is exemplified in a four-valve DOHC direct-injection, four-stroke-cycle diesel engine in which two intake valves and two exhaust valves are carried in the cylinder head in such a manner as to surround a fuel injector nozzle 3. In the direct-injection diesel engine 1 shown in FIG. 4, diesel fuel is forced into the combustion chamber by way of a high-pressure fuel-injection system. In the shown embodiment, the high-pressure fuel-injection system comprises at least an electronically-controlled fuel-injection pump unit 2 and a fuel injector nozzle 3. During operation of the pump unit 2, diesel fuel is sprayed out or injected directly into the combustion chamber 4. As seen in FIG. 4, the direct-injection diesel engine 1 is equipped with an exhaust-gas recirculation (EGR) system to return a part of inert exhaust gases to the intake manifold to lower the combustion temperature and consequently reduce the formation of nitrogen oxides ($NO_x$). The EGR system comprises an exhaust-gas recirculation passage 5 (simply an EGR pipe), an exhaust-gas recirculation (EGR) valve 6, and an intake throttle valve 8 provided upstream of a collector 7 (at the introduction position of EGR gases). An EGR gas cooling device 9 is attached to the EGR pipe 5, to cool the EGR gases by way of engine-coolant flow through the EGR cooling device. As a swirl generating means, a swirl control valve 10 is provided downstream of the collector 7, and whereby it is possible to create a controlled swirl motion in the combustion chamber 4. In the shown embodiment, the diesel engine 1 is further equipped with a variable nozzle turbocharger 12 having a variable nozzle actuator 11, and an inter-cooler 13. The variable nozzle turbocharger 12 is provided in the induction and exhaust systems for variably adjusting or controlling a boost pressure (the increased pressure of induction air). In FIG. 4, reference sign 14 denotes an air flowmeter or an air flow sensor. Usually, a hot-wire mass air flow meter is used as the air flow meter 14. Reference sign 15 denotes an intake-air temperature sensor which is located upstream of a compressor pump of a variable nozzle turbocharger 12 and just downstream of the air-flow meter 14. FIG. 5 shows an example of an electronically-controlled fuel injection system involving the electronically-controlled fuel injection pump unit 2 and the fuel injector nozzle 3. As seen in FIG. 5, in the embodiment, a distribution type fuel injection pump unit is used as the electronically-controlled fuel injection pump unit 2. The fuel injection pump unit 2 comprises a driveshaft 21, a fuel feed pump 22, a pump chamber 23, a face cam disc 24, a pump plunger 25, a discharge outlet valve 26 often called "a delivery valve", an axially slidable control sleeve 27, a rotary solenoid 28, and a fuel-cut valve unit 29. The feed pump 22 is driven or rotated by the driveshaft 21, to pressurize diesel fuel. The driveshaft 21 has a driven-connection with the diesel engine 1. The pump chamber 23 is defined in the pump case to temporarily store the fuel pressurized by the feed pump 22. The pump chamber 23 is also included in a pump lubrication system used for lubrication of the interior of the pump. The pump plunger 25 is coaxially connected to the right-hand end (viewing FIG. 5) of the driveshaft 21 for example by way of spline connection, so that the plunger 25 rotates together with the driveshaft 21, while permitting an axial sliding motion of the plunger 25 with respect to the driveshaft 21 by virtue of the face cam 24. Thus, the diesel fuel present in the pump chamber 23 is sucked in by way of an axial reciprocating motion of the plunger 25. Also provided is a cam mechanism consisting of the face cam disc 24 and a substantially cylindrical roller holder (not numbered) located at the left hand of the face cam 24 and serving as a cam follower communicated to the face cam 24. The cam mechanism is located at the connecting portion (the spline-connection portion) between the right-hand end of the driveshaft 21 and the left-hand end of the pump plunger 25, to produce the axial reciprocating motion of the plunger 25. The axial reciprocating motion of the plunger 25 produces a high-pressure pumping action. The previously-noted roller holder located near the face cam 24 surrounds the outer periphery of the spline-connection portion between the drive-shaft right end and the pump-plunger left end. The inner periphery of the roller holder is out of contact with or in sliding-contact with the outer periphery of the previously-noted spline-connection portion, so as to permit the rotary motion of the driveshaft 21 without any rotary motion of the roller holder. Although it is not shown, actually a plurality of circumferentially equally-spaced rollers are rotatably held in the roller holder. On the other hand, the face cam disc 24 is formed, on its left-hand side wall, integral with a circumferentially undulated, contoured cam surface. The circumferentially undulated, contoured cam surface of the face cam 24 consists of a plurality of cam lobes (ridges) and a plurality of cam grooves (troughs) alternating with each other. The left-hand contoured cam surface of the face cam 24 mates with the respective rollers rotatably employed in the roller holder, to provide a cam-connection between the plural rollers in the roller holder and the contoured cam surface of the face cam 24. Each of the cam lobe sections of the face cam 24 is associated with the engine cylinder of a certain cylinder number, such that there is a one-to-one correspondence between the cam lobe sections and the individual engine cylinders. The face cam 24 is biased in the axially leftward direction by way of a return spring (not numbered) such as a coiled compression spring, to permanently keep the cam connection, irrespective of engine speed and load. Thus, the rotary motion of the face cam 24 is converted into the reciprocating motion of the pump plunger 25 by virtue of the cam mechanism discussed above. The electronically-controlled fuel-injection pump unit 2 also comprises a fuel-injection timing control piston 30, often called a "timer piston", and a timing control valve 31 which will be fully described later. These component parts, constructing a part of the injection pump unit 2, serve as a fuelinjection timing adjustment device (or a fuel-injection timing adjustment means). The roller holder of the cam mechanism is mechanically linked via a rod-like linkage (not numbered) to the timer piston 30. As can be appreciated from FIG. 5, the axial position of the face cam 24 is determined depending on the axial position of the timer piston 30. More precisely, when the timer piston 30 moves axially leftwards (toward a low-pressure chamber facing the spring-biased left-hand end of the timer piston) from the position shown in FIG. 5, the rod-like linkage also moves leftwards, because one end of the rod-like linkage is securely connected to the center of the timer piston 30 and the other end of the linkage is connected to the roller holder. Conversely, when the timer piston 30 moves axially rightwards (toward a high-pressure chamber facing the right-hand end of the timer piston) from the spring-loaded position shown in FIG. 5, the rod-like linkage moves rightwards, and thus the cam mechanism is slightly displaced in the axial rightward direction. With the previously-noted arrangement, each time one of the cam lobes of the face cam 24 passes through a certain roller of the roller holder, the plunger 25 axially moves once. Therefore, when the plunger 25 is rotated together with the driveshaft 21, the plunger 25 axially reciprocates as many times as the number of the cam lobes for every one revolution of the plunger 25. Actually, the plunger 25 is axially slidably accommodated in a pump-plunger cylinder (not numbered) to provide a high-pressure pumping action. During the suction stroke with the axial leftward movement of the plunger 25, fuel in the pump chamber 23 is fed through an inlet port of the plunger cylinder into a pumping chamber facing the rightmost end face of the plunger 25. On the contrary, during the discharge stroke with the axial rightward movement of the plunger 25, the diesel fuel in the pumping chamber is pressurized and simultaneously the pressurized fuel is fed through a plunger axial bore (not numbered) and a cut-off port (not numbered) via a distribution port cut-out on the outer periphery of the plunger to one of a plurality of discharge ports (not numbered) defined in the cylinder. The plunger axial bore is axially defined in the plunger in such a manner as to extend along the center axis of the plunger. The plunger axial bore intercommunicates the previously-discussed pumping chamber facing the plunger rightmost end. Depending on the axial position of the control sleeve 27, the cut-off port is able to be closed by the inner peripheral wall surface of the control sleeve 27. The distribution groove is formed on the outer periphery of the plunger 25 as a cut-out or notched portion. Then, the pressurized fuel is delivered through the delivery valve 26, such as a one-way check valve, via a high-pressure conduit (not numbered) to a fuel injector nozzle 3 under high pressure. Note that, for the sake of illustrative simplicity, only one of the plurality of fuel injector nozzles 3 is shown. In actual, an individual fuel injector 3 is used for each engine cylinder. As discussed above, the axial position of the roller holder included in the cam mechanism relative to the driveshaft 21 is changeable by adjusting the axial position of the timer piston 30. The change in the axial position of the roller holder results in a slight relative axial displacement between the driveshaft 21 and the plunger 25. The slight axial displacement of the plunger 25 to the driveshaft 21, causes a change in the timing of matching between the distribution groove of the plunger 25 and the respective discharge port of the pump-plunger cylinder. That is, the change in the axial position of the roller holder induces a change in the fuel injection timing (exactly a change in the timing of initiation of fuel injection). As set forth above, the fuel injection timing (the timing of initiation of injection) can be controlled by properly adjusting the axial position of the roller holder (that Is, the axial position of the timer piston 30). The control sleeve 27 is provided near the innermost end of the pump-plunger cylinder so that the control sleeve is slidably fitted onto a portion of the plunger 25 projecting out of the innermost end of the pump-plunger cylinder, and so that the fuel in the pumping chamber is leaked through the cut-off port and returned again to the pump chamber 23 when the cut-off port moves out of the inner peripheral surface of the control sleeve 27 and thus exposes to the pump chamber 23. Such fuel leakage causes the pressure of fuel in the pumping chamber to rapidly drop, and as a result the fuel pressure in the discharge port is rapidly dropped and becomes less than a set pressure of the discharge outlet valve 26. As a consequence, the discharge outlet valve 26 (the one-way check valve) is closed. With the valve 26 closed, the fuel pressure in the fuel injector 3 drops and the injector needle valve return spring (not shown) forces the injector needle valve to remain closed and thus prevents any fuel leakage from the injector nozzle 3. In this manner, a series of fuel injecting operation terminates. The axial position of the control sleeve 27 is adjusted by means of the rotary solenoid 28 and a linkage mechanically linking the rotary solenoid 28 with the control sleeve 27. As previously discussed, the timing of termination of fuel injection (in other words, the amount of fuel injection) is controllable by adjusting the position of the control sleeve 27 through rotary motion of the rotary solenoid 28. Usually, the rotary motion of the rotary solenoid 28 is obtained electromagnetically. The fuel-cut valve 29 operates to forcibly stall the engine by stopping the fuel supply to the pumping chamber by shutting off the suction port by a poppet-like valve of the fuel-cut valve unit 29. The adjustment of the axial position of the timer piston 30 will be described hereunder.

As seen in FIG. 5, the timer piston is slidably accommodated in a timer-piston chamber defined in the pump casing of the fuel injection pump 2. The left-hand portion of the timer-piston chamber cooperates with the left-hand end face of the timer piston 30 to define a low-pressure chamber (see the lower chamber shown in FIG. 6), whereas the right-hand portion of the timer-piston chamber cooperates with the right-hand end face of the timer piston 30 to define a high-pressure chamber (see the upper chamber shown in FIG. 6). The high-pressure chamber communicates the pump chamber 23. The left end of the timer piston 30 faces the low-pressure chamber communicating with the suction side of the feed pump 22. A return spring such as a coiled compression spring is operably disposed in the low-pressure chamber to permanently bias the timer piston 30 in a direction of the high-pressure chamber, that is, in the axial rightward direction (viewing FIG. 5). The high-pressure chamber is communicated through the timing control valve 31 with the low-pressure chamber. The opening and closing of the timing control valve 31 is controlled or regulated in response to a duty-cycle signal or a pulse-width time signal (or a pulse-width modulated voltage signal often called a "PWM signal") which is generated from a control unit 39. Generally, the timing control valve 31 comprises an electromagnetic solenoid valve, whereas the control unit 39 comprises a microcomputer. In more detail, with a decreased duty cycle or the decreased solenoid ON time or the decreased solenoid valve opening time of the timing control valve 31, the amount of leakage of diesel fuel from the high-pressure chamber to the low-pressure chamber is reduced and as a result the fuel pressure in the high-pressure chamber rises up to a relatively high pressure level with respect to the fuel pressure in the low-pressure chamber. The relative pressure rise in the high-pressure chamber forces the timer piston 30 in a direction of the low-pressure chamber (in axial leftward direction) against the bias of the return spring. The axial leftward movement of the timer piston 30 causes the axial leftward movement of the cam mechanism (involving the face cam disc 24), and as a result the fuel injection timing is retarded. Conversely when the duty cycle of the timing control valve 31 is increased, the fuel leakage from the high-pressure chamber to the low-pressure chamber is increased. Thus, the fuel pressure in the high-pressure chamber drops to a relatively low pressure level substantially equal to the fluid pressure in the low-pressure chamber. Due to the pressure drop of the high-pressure chamber, the timer piston 30 moves toward the high-pressure chamber by way of the spring bias. The axial rightward movement of the timer piston 30 causes the axial rightward movement of the cam mechanism, with the result that the fuel injection timing is advanced. As input informational signal data necessary for the fuel-injection timing control, the input interface of the control unit 39 receives signals from various engine/vehicle sensors, namely an engine speed sensor 32, a pump speed sensor 33, an accelerator sensor 34, a fuel-injector needle valve lift sensor 35, a water temperature sensor 36 (or an engine coolant temperature sensor), a fuel temperature sensor 37, and an ignition key switch 38. In the shown embodiment, each of the two rotational speed sensors, namely the engine speed sensor 32 and the pump speed sensor 33, is comprised of an electromagnetic pulse pickup type speed sensor. For example, the pulse pickup type speed sensor constructing the pump speed sensor 33 consists of a ring-gear like toothed signal disc plate (a rotor disc) which is fixed to the driveshaft 21 of the fuel-injection pump unit 2 for co-rotation with the drive shaft 21, and a pickup coil (a stator) which is mounted on the pump casing and wound usually on an iron core. The pulse voltage signal from the engine speed sensor 32 is sent out to the input interface of the control unit 39. The control unit detects a crankshaft angular position or a crank angle from the voltage pulse signal from the sensor 32, and also detects an engine speed Ne from a frequency of the pulse signal. The accelerator sensor 34 is provided for detecting the opening CL of the accelerator or the control-lever opening (generally regarded as a value equivalent to the engine load). The lift sensor 35 is provided for detecting an actual lift of the needle valve of the fuel injector 3, thus detecting an actual fuel-injection timing of the injector. Usually, the duty cycle value of the timing control valve 31 is arithmetically calculated by a central processing unit (CPU) employed in the microcomputer of the control unit 39, for example, on the basis of the engine-speed indicative signal Ne from the engine speed sensor 32, the engine-load indicative signal from the accelerator sensor 34, and the actual fuel-injection timing indicative signal from the lift sensor 35. The water temperature sensor 36 is provided for measuring or sensing a temperature of engine. In the shown embodiment, although the water temperature sensor 36 is used as an engine temperature sensor, in lieu thereof, an engine oil temperature sensor may be used for detecting the engine temperature or as to whether the operating condition of the engine is cold or warm. The fuel temperature sensor 37 is provided for measuring or sensing a temperature of diesel fuel present in the pump chamber 23. The central processing unit of the control unit 39 executes various preprogrammed arithmetic calculations, namely calculation of a fuel-injection amount Qsol, calculation of a lift value of the EGR valve 6, calculation of the opening of the intake throttle valve 8, determination of the fuel injection timing, calculation of the opening of the swirl control valve 10, and the like. Based on results of the abovementioned arithmetic calculations, the output interface of the control unit 39 controls or drives the rotary solenoid 28 and the fuel-cut valve 29, both contributing to the fuel injection amount control. The output interface also outputs a drive signal to the timing control valve 31 to perform a desired fuel injection timing determined by the predetermined arithmetic processing, thus regulating the ignition delay duration. As will be fully described later, the control unit 39 further controls or drives the EGR valve 6 and the swirl control valve 10, to control both the combustion temperature and the intensity of swirl flow in the combustion chamber.

Figure 7:
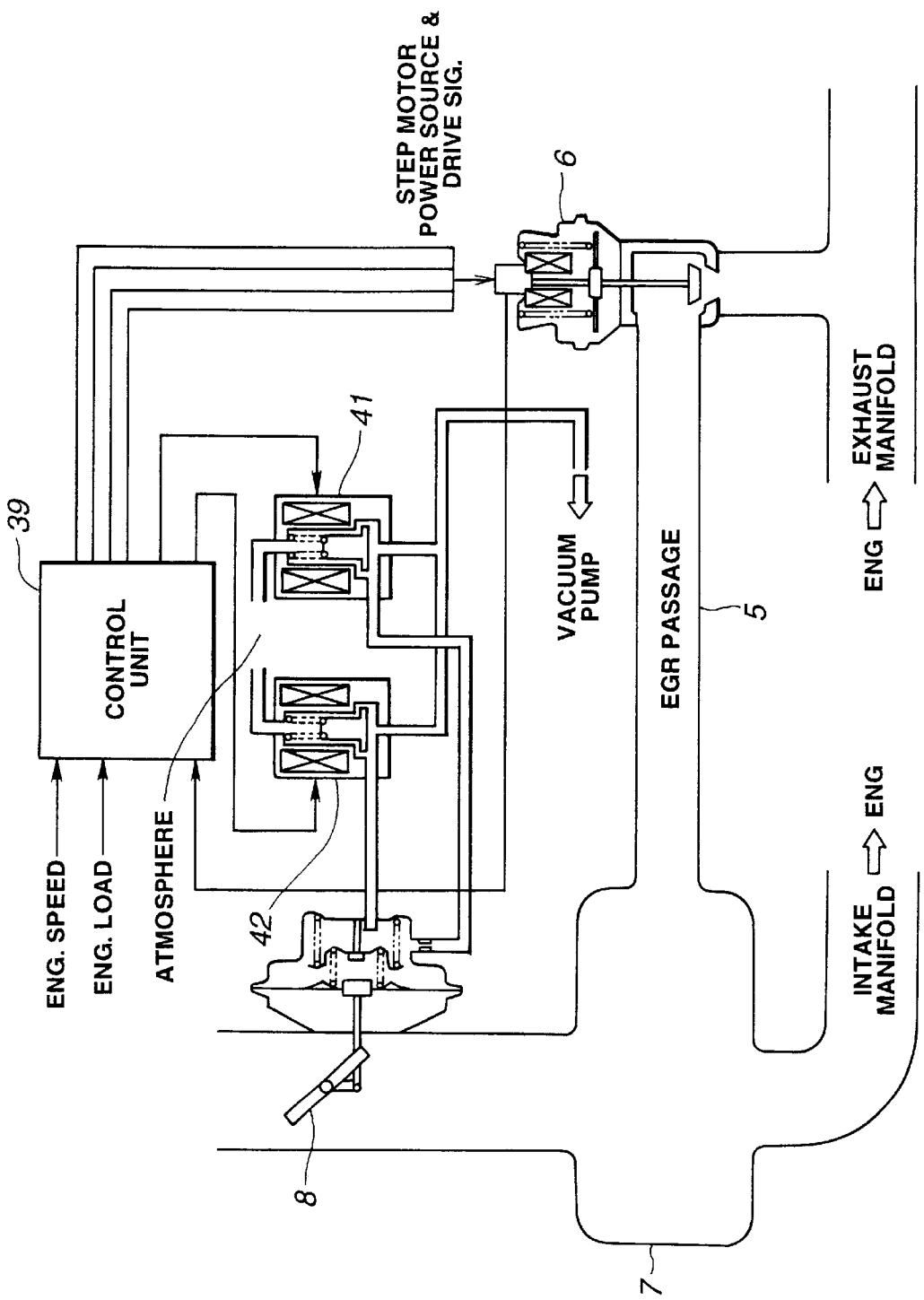
FIG. 7 is a system diagram showing one example of an exhaust-gas recirculation (EGR) system.

Referring now to FIG. 7 there is shown the detailed construction of the EGR system. As seen in FIG. 7, the EGR valve unit 6 comprises a step motor or a stepping motor. The valve lift value (or the EGR amount) of the EGR valve 6 is adjusted in response to a control signal (a drive signal) output from the control unit 39 to the step motor. Although the EGR valve unit of the embodiment is a stepping-motor driven type, a negative-pressure operated EGR valve may be used in lieu thereof. Alternatively, the EGR amount may be controlled depending on an intake-air amount derived from a signal value from a pressure sensor. On the other hand, the intake throttle valve 8 is constructed as a negative-pressure actuated valve. Actually, the intake throttle valve 8 is linked to a vacuum-operated mechanism, consisting of a diaphragm unit and two electromagnetic shut-off valves 41 and 42, so that the angular position of the throttle valve 8 is adjusted by way of the vacuum fed into the diaphragm chamber of the diaphragm unit through the valves 41 and 42. The angular position of the valve 8 is operated in a stepwise manner by means of the two electromagnetic shut-off valves 41 and 42. The negative-pressure chambers of the valves 41 and 42 are connected to a vacuum pump. The opening and closing of each of the electromagnetic valves 41 and 42 is controlled through an ON-OFF control system. When the electromagnetic valves 41 and 42 are both energized, the two electromagnetic shut-off valves are maintained at their full-open positions, thus adequately introducing a negative pressure from the vacuum pump into the intake-throttle-valve actuator linked to the disc valve (the butterfly valve) of the intake throttle valve 8. With the valves 41 and 42 both energized, the intake throttle valve 8 is kept in its fully-closed position. When either one of the two valves 41 and 42 is energized, part of the negative pressure is introduced into the actuator, thus maintaining the disc valve of the intake throttle valve at its half-open position. In this manner, the pressure In the collector 7 can be regulated by controlling ON/OFF states of the valves 41 and 42.

Figure 8:
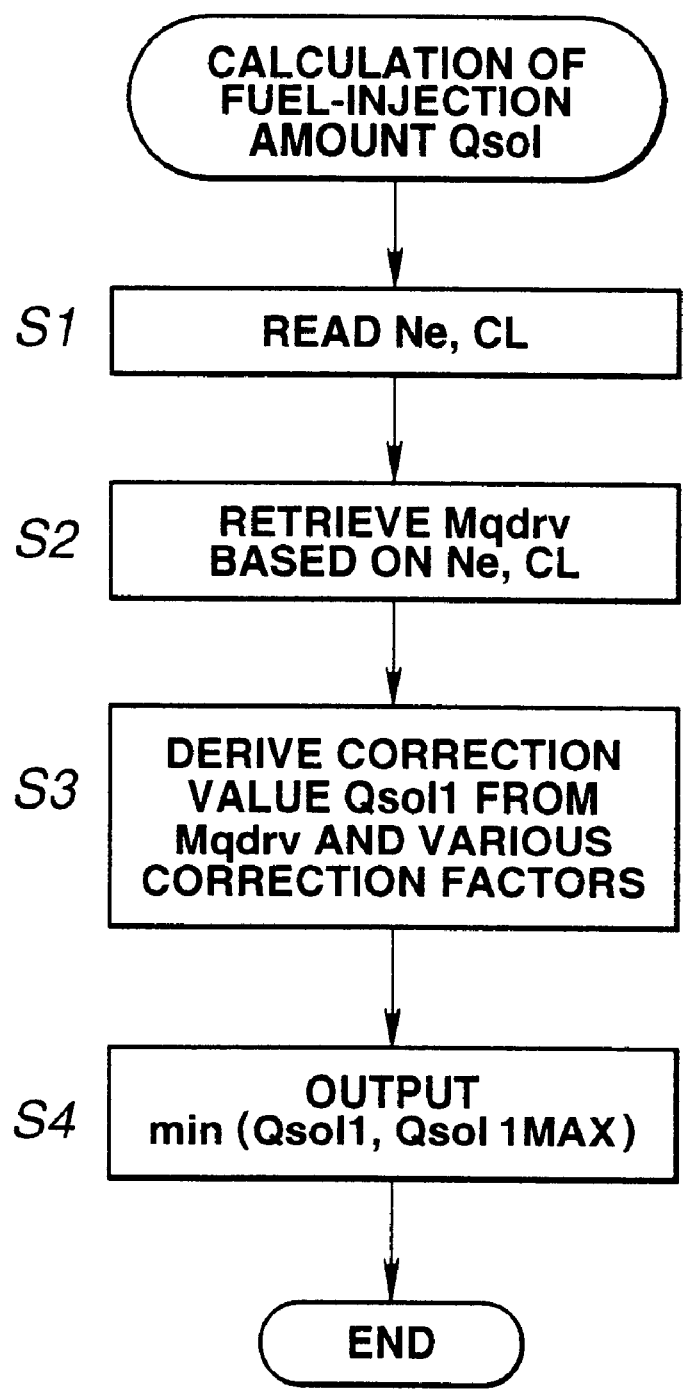
FIG. 8 is a flow chart illustrating the arithmetic calculation necessary to derive a fuel-injection amount (Qsol).

Referring to FIG. 8, there is shown a routine for arithmetic calculation of the fuel-injection amount Qsol.

Figure 9:
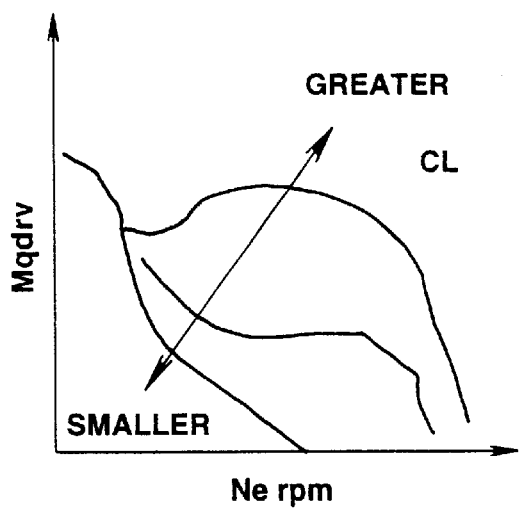
FIG. 9 is a basic fuel-injection amount characteristic map used to retrieve a basic fuel-injection amount (Mqdrv).
Figure 10:
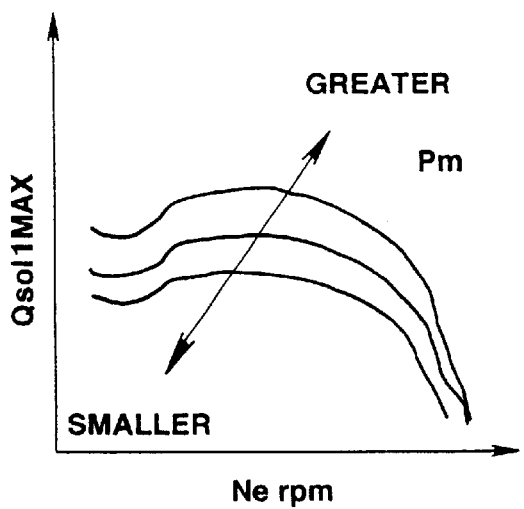
FIG. 10 is a maximum fuel-injection amount characteristic map used to retrieve the maximum fuel-injection amount (Qsol1MAX) which is dependent on both the engine speed (Ne) and the intake pressure or the boost pressure (Pm).
Figure 11:
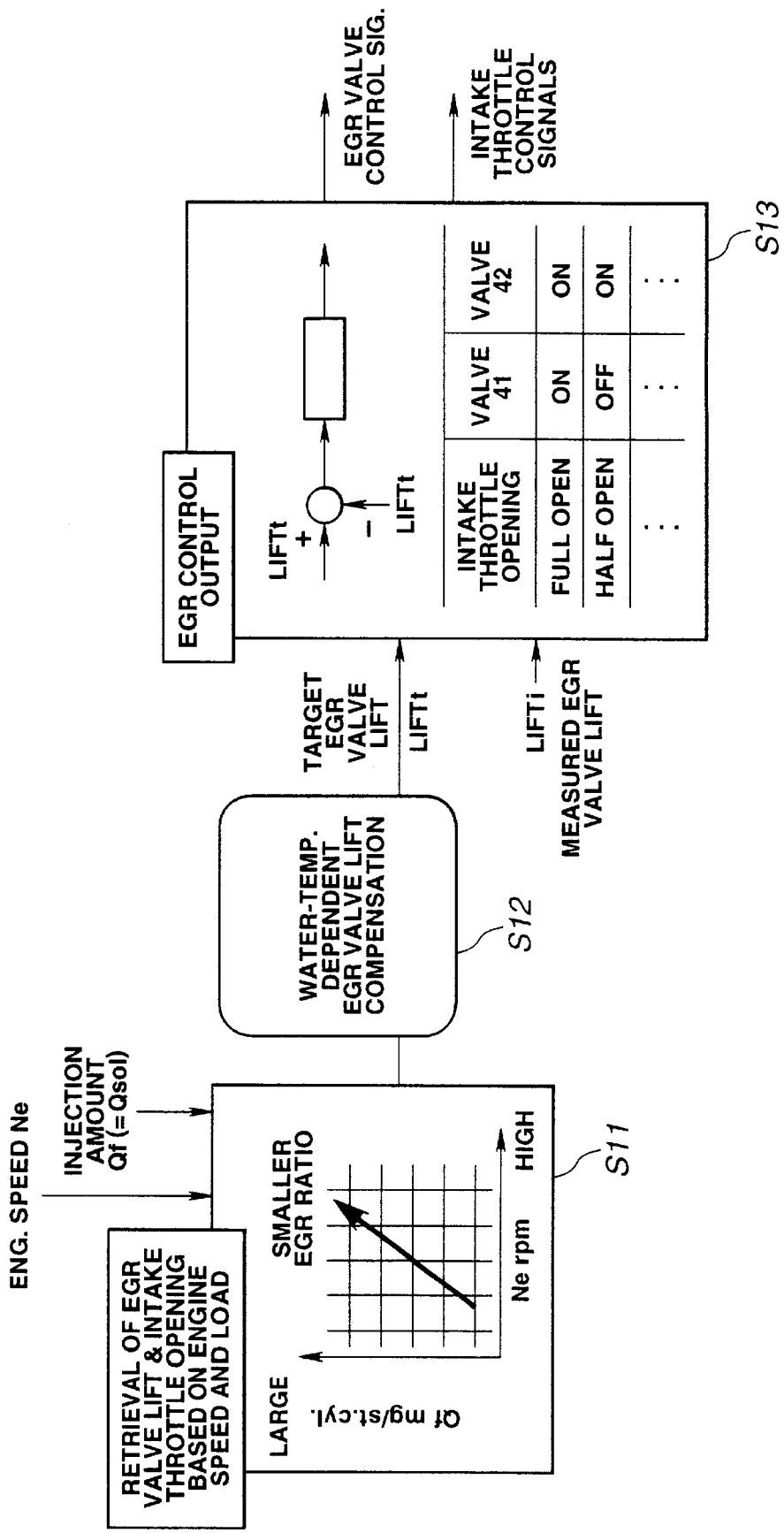
FIG. 11 is a block diagram necessary for the EGR control.

In step SI, the engine speed Ne and the accelerator opening CL are read. In step S2, a basic fuel-injection amount Mqdrv is retrieved from the preprogrammed map shown in FIG. 9 or the preprogrammed look-up table, on the basis of both the engine speed Ne and the accelerator opening CL (regarded as the engine load). In step S3, the basic fuel-injection amount Mqdrv is corrected by various correction factors such as a water-temperature dependent correction factor and the like, to produce a corrected fuel-injection amount Qsol1. In step S4, when the corrected fuel-injection amount Qsol1 exceeds an upper limit (a given maximum fuel-injection amount Qsol1MAX), the corrected fuel-injection amount Qsol1 is replaced with the upper limit Qsol1MAX to keep the actual output value of the fuel-injection amount Qsol within the upper limit. Conversely, when the corrected fuel-injection amount Qsol1 is below the upper limit Qsol1MAX, the corrected fuel-injection amount Qsol1 is regarded as the actual output value of the fuel injection amount Qsol. The final fuel injection amount Qsol is represented as the expression Qsol=min (Qsol1, Qsol1MAX). That is, the smaller one of the two values Qsol1 and Qsol1MAX is selected as the final fuel injection amount Qsol. FIG. 10 shows an example of the maximum fuel-injection amount (Qsol1MAX) characteristic map. As can be appreciated from the map shown in FIG. 10, the maximum fuel-injection amount Qsol1MAX is retrieved from the map on the basis of both the engine speed Ne and the boost pressure (or the intake pressure) Pm. FIG. 11 shows the block diagram illustrating the EGR control (corresponding to the combustion-temperature control) executed by the diesel-engine control system of the invention.

In step S11, an EGR valve opening (corresponding to an EGR valve lift) and an opening of the intake throttle valve 8 are retrieved from a preprogrammed map as shown in the left-hand block of FIG. 11, on the basis of both the engine speed Ne and the fuel-injection amount Qf (=Qsol regarded as an engine load). The fuel-injection amount Qf means a fuel-injection amount/cylinder/intake stroke and is represented by a unit (mg/st.cyl.). In step S12, the EGR valve opening (or the EGR valve lift), retrieved at step Sll, is corrected depending on the water temperature sensed by the water temperature sensor 36. In more detail, an EGR amount correction factor is retrieved from a predetermined look-up table indicating the relationship between the water temperature and the EGR amount correction factor. The EGR valve opening, retrieved at step Sll, is compensated for depending on the EGR amount correction factor obtained through step S12. The EGR valve opening obtained through step S12 will be hereinafter referred to as a "target EGR valve opening". As discussed above, the EGR control is regarded as the combustion temperature control, since the combustion temperature can be changed by adjusting the opening of the EGR valve 6. Thus, the EGR system is regarded as a combustion temperature control means. According to the system of the embodiment, the combustion temperature is properly compensated for by way of the water-temperature dependent EGR valve lift compensation executed at step S12 of FIG. 11. Thus, the compensating operation of step S12 is regarded as a water-temperature dependent combustion temperature compensation means. Details of the EGR valve opening compensation will be hereinbelow described in detail by reference to FIGS. 12 and 13. In step S13, the target EGR valve opening LIFTt, water-temperature corrected at step S12, is comparedwith an actual EGR valve opening LIFTi measured by an EGR valve lift sensor (not shown) which is usually located at the EGR valve 6. In step S13, an EGR valve control signal is determined on the basis of the comparison result between the two values LIFTt and LIFTi (or the deviation from the target EGR valve opening LIFTt), so that the actual EGR valve opening LIFTi is adjusted toward the target EGR valve opening LIFTt. The EGR valve control signal value corresponds to the number of angular steps of the stepping motor for the EGR valve 6. Additionally, in step S13, to satisfy the target intake throttle valve opening determined at step S11, a control signal to be output to the first electromagnetic valve 41 and a control signal to be output to the second electromagnetic valve 42 are properly selected out of ON/OFF signals.

Figure 6:
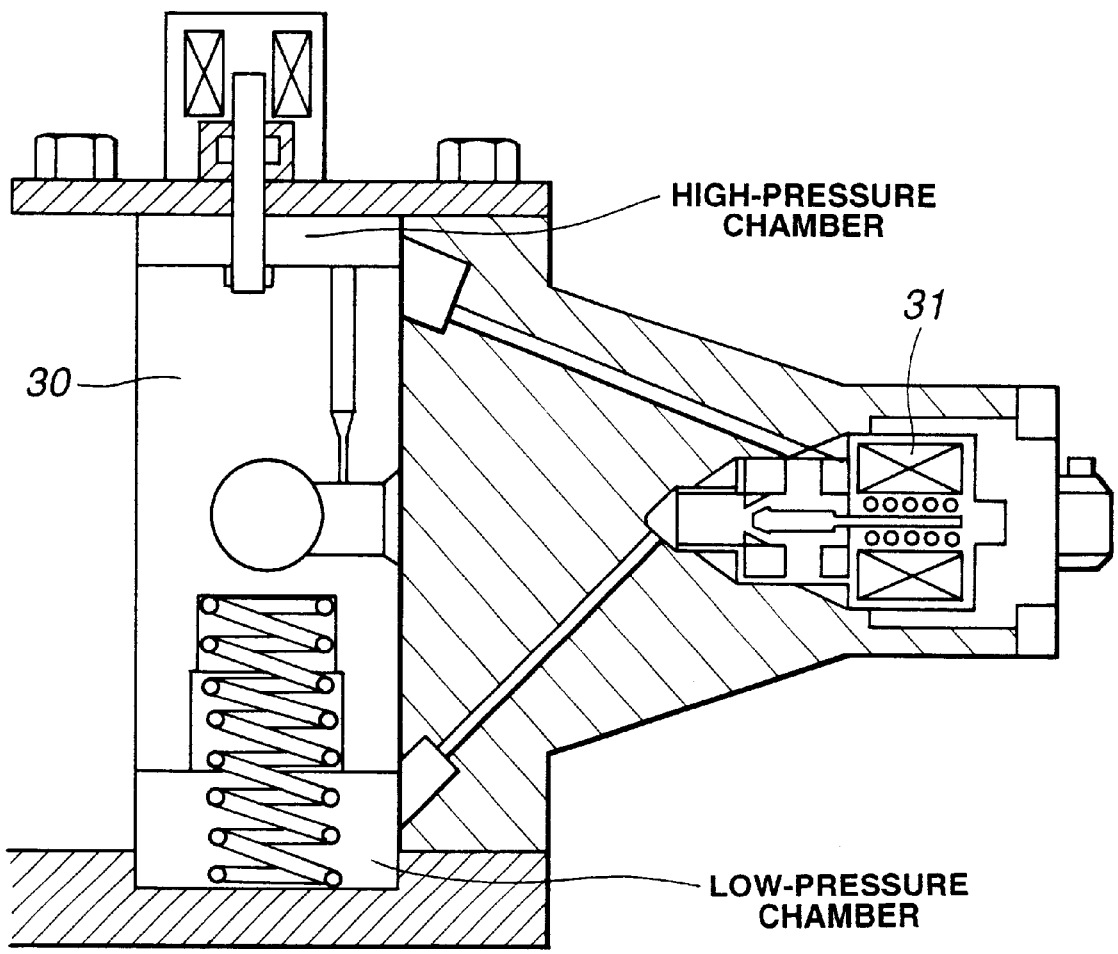
FIG. 6 is a cross section showing details of the construction of an injection timing adjustment device applicable to the direct-injection diesel engine of the invention.
Figure 12:
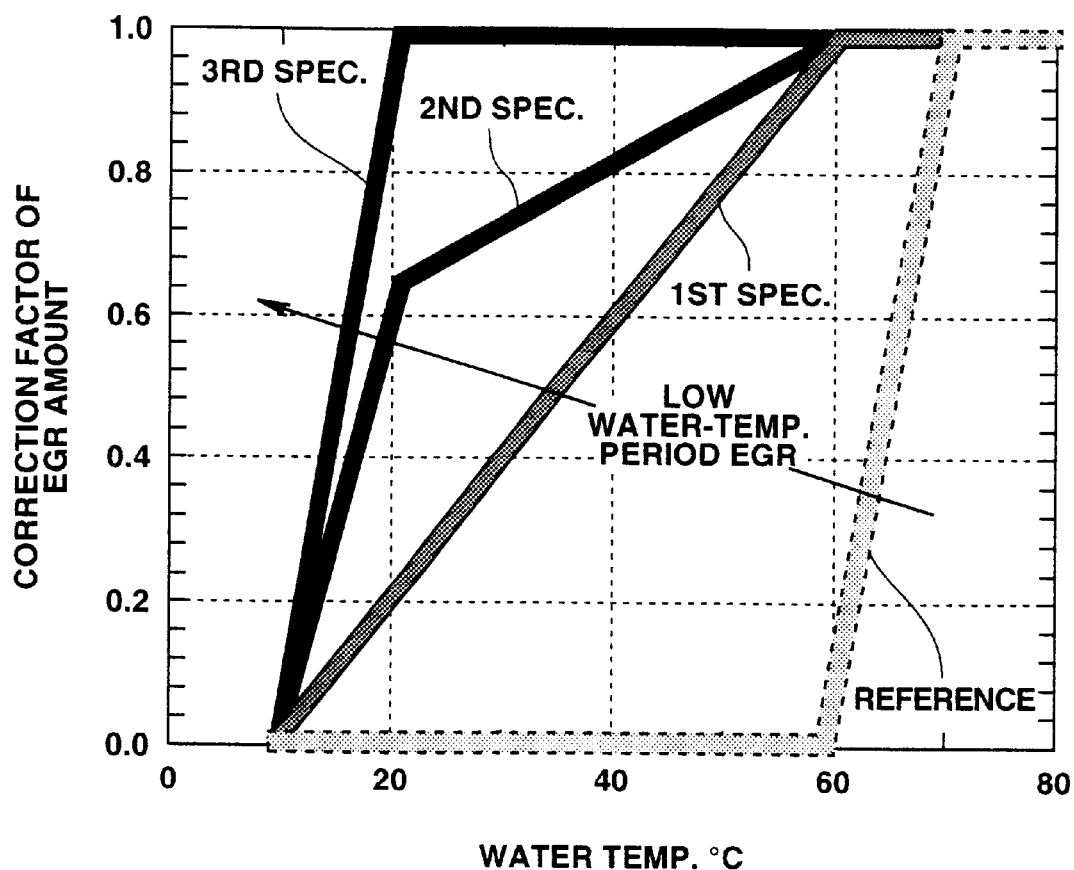
FIG. 12 is a look-up table showing one example of an EGR-amount correction table according to which the EGR amount is corrected depending upon the water temperature detected.
Figure 13A:
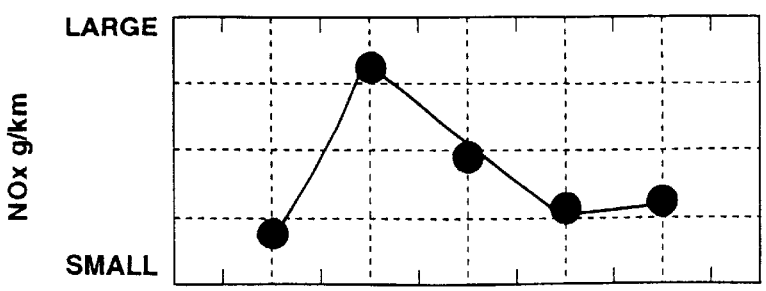
FIGS. 13A–13E are charts showing levels of various exhaust emissions, namely $NO_x$, PM, HC, and CO, and the fuel consumption (abbreviated to "FC"), in two different engine operating conditions (after warm-up and during engine cold start), and in four different water-temperature versus EGR-amount correction factor characteristics during the cold start.
Figure 13B:
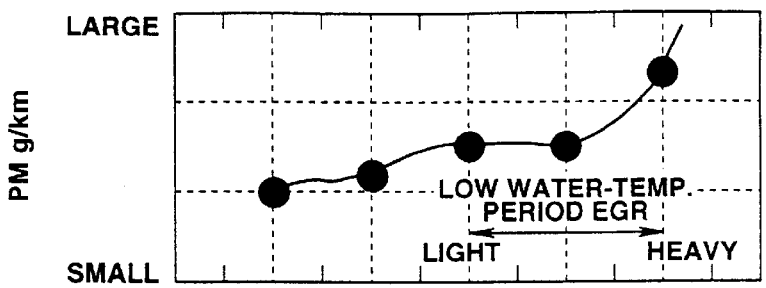
Figure 13C:
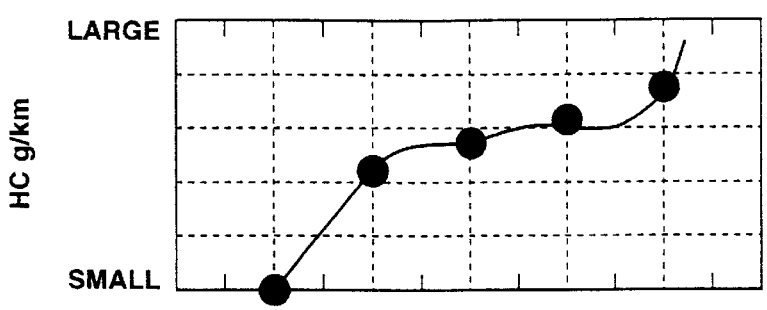
Figure 13D:
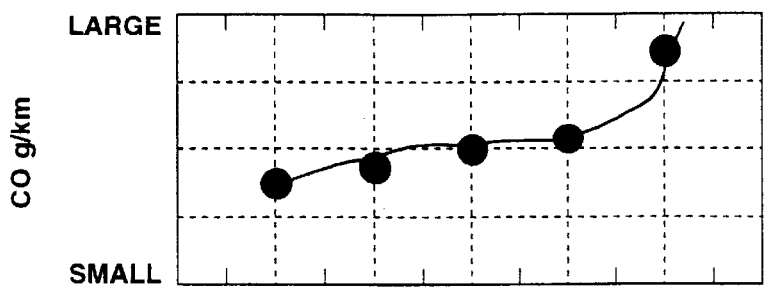
Figure 13E:
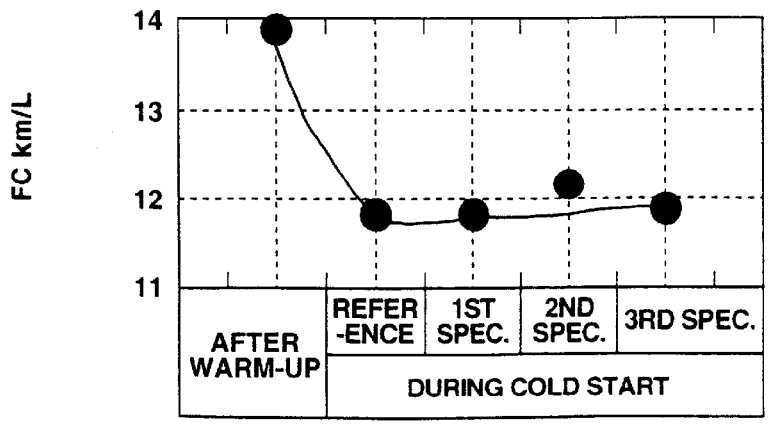
Figure 14:
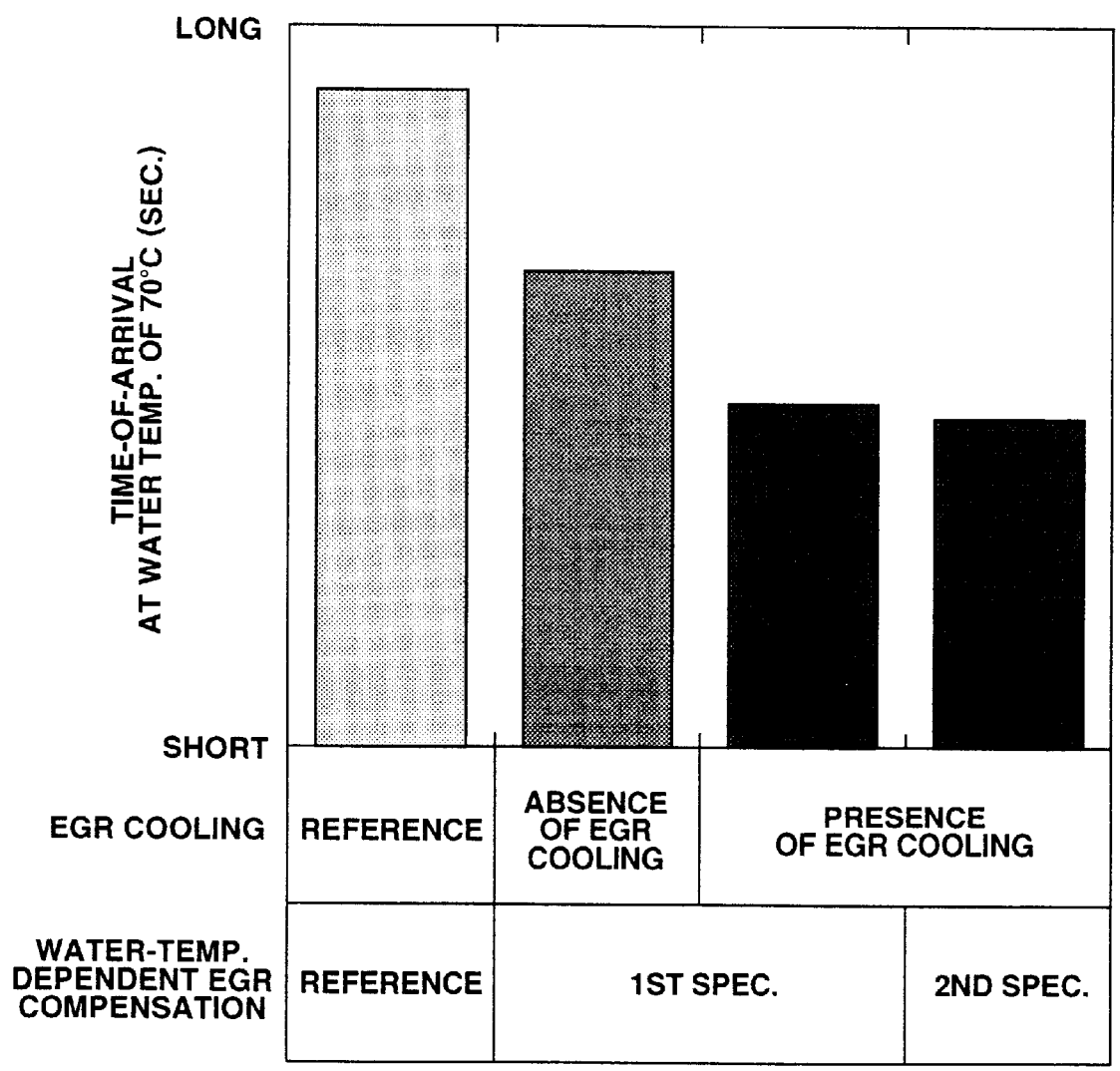
FIG. 14 is a bar graph showing the effect of the promotion of engine warm-up operation, based on the water-temperature dependent EGR valve lift compensation, in various conditions, that is, the presence or absence of an EGR gas cooling, and the three different water-temperature versus EGR-amount correction factor characteristics (REFERENCE, 1ST SPEC., and 2ND SPEC.).

An example of the water-temperature dependent EGR valve lift compensation look-up table related to step S12 of FIG. 11 is shown in FIG. 12. In FIG. 12, a typical water-temperature versus EGR-amount correction factor characteristic is indicated as "REFERENCE". As seen in FIG. 12, according to the characteristic indicated by the "REFERENCE", any correction is not made to the EGR amount, until the water temperature exceeds 60° C., that is, during the cold-engine warm-up period. In the "REFERENCE" characteristic, the EGR-amount correction factor increases linearly from 0.0 to 1.0, as the water temperature increases from 60° C. to 70° C. According to the characteristic of the first specification abbreviated to "1ST SPEC.", the EGR-amount correction factor increases linearly from 0.0 to 1.0, as the water temperature increases from 10° C. to 60° C. According to the characteristic of the second specification abbreviated to "2ND SPEC.", the EGR-amount correction factor increases linearly from 0.0 to a predetermined value near and above 0.6, as the water temperature increases from 10° C. to 20° C. Then, in the "2ND SPEC."

characteristic, the EGR-amount correction factor increases from the predetermined value close to 0.6 to 1.0, as the water temperature increases from 20° C. to 60° C. According to the characteristic of the third specification abbreviated to "3RD SPEC.", the EGR-amount correction factor increases linearly from 0.0 to 1.0, as the water temperature increases from 10° C. to 20° C. At the water temperature above 20° C., in the "3RD SPEC." characteristic, the EGR-amount correction factor is held at "1.0". The steep gradient between 10° C. and 20° C. in the "3RD SPEC." characteristic means that the water-temperature dependent EGR-amount correction is more quickly achieved in comparison with the "2ND SPEC." characteristic. In the same manner, in case of the "2ND SPEC." characteristic, the water-temperature dependent EGR-amount correction is more quickly achieved as compared with the "1ST SPEC." characteristic. The "2ND SPEC." characteristic has an intermediate EGR-amount correction characteristic between the "1ST SPEC." and "3RD SPEC." characteristics. For example, in case of the "3RD SPEC." characteristic, the EGR amount tends to rapidly change to heavy during the low water-temperature period, owing to the more quick change in the EGR-amount correction factor within a relatively narrow low water-temperature range (10° C. through 20° C.). Thus, as described later in reference to FIGS. 13A–13E, in the "3RD SPEC." characteristic there is an increased tendency for the rate of incomplete combustion to increase. FIGS. 13A through 13E show the relationship among various exhaust emissions ($NO_x$, PM, HC, and CO), and the fuel consumption (FC), in five different operating conditions, that is, the "REFERENCE" after warm-up, the "REFERENCE" during cold start, the "1ST SPEC." during cold start, the "2ND SPEC." during cold start, and the "3RD SPEC." during cold start. Simulations shown in FIGS. 13A–13E are made with respect to a direct-injection diesel engine equipped with an open combustion chamber having a toroidal bowl type cavity, a high-pressure fuel system having a high-pressure distributor type fuel injection pump as shown in FIGS. 5 and 6, and a swirl control device having a high-swirl piston head and a swirl control valve through which the swirl motion in the combustion chamber varies from a low-level swirl motion to a high-level swirl motion, or vice versa. As seen in FIGS. 13A–13E, the "REFERENCE" is inferior to the other specifications in lowering $NO_x$ emissions. During the engine cold start, the "2ND SPEC." is superior to the other in lowering $NO_x$ emissions. Also, the "3RD SPEC." is inferior to the other in lowering PM emissions, unburnt fuel (HC), and unburnt gases (CO). The "2ND SPEC." is superior in the trade-off relationship between reduction in $NO_x$ emissions and reduction in PM emissions to the other specifications. Combustion rate wave-forms obtainable by the "REFERENCE", "2ND SPEC.", and "3RD SPEC.", respectively shown in FIG. 12, are hereunder explained in detail by reference to FIG. 2. Hereupon, the term "combustion rate" means the rate of a cumulative calorific value at a point of time to a total calorific value obtainable at one combustion cycle from the beginning of combustion to the end of combustion. In case of the "REFERENCE" characteristic, in two different engine operating modes, namely after engine warm-up (see the leftmost waveform shown in FIG. 2) and during engine cold operation (see the rightmost waveform shown in FIG. 2), a combustion-rate waveform similar to that of the usual or conventional direct-injection diesel engine (abbreviated to "conventional DI") is carried. The "2ND SPEC." characteristic carries an intermediate combustion-rate waveform (a combustion-rate waveform of the present invention) between the left-hand and right-hand waveforms obtained by the conventional DI after warm-up and during cold engine operation. On the contrary, in case of the "3RD SPEC.", the rate of incomplete combustion tends to increase due to heavy EGR resulting from the steep EGR-amount correction factor characteristic. Thus, the "3RD SPEC." exhibits the combustion-rate waveform similar to the rightmost waveform obtained by the conventional DI during cold engine operation. As set out above, the "2ND SPEC." characteristic is superior to the other, from the viewpoint of the trade-off relationship between the $NO_x$ and PM emissions. The previously-described water-temperature versus EGR-amount correction factor characteristic as described in FIG. 12 varies depending on various types and specifications of internal combustion engines. However, it will be easily appreciated that it is possible to determine or estimate a superior one of a plurality of different water-temperature versus EGR-amount correction factor characteristics from comparison results among combustion-rate waveforms obtained by the respective characteristics. FIG. 14 shows the effect of the promotion of engine warm-up operation, when the EGR gas cooling device 9 also comes into operation in addition to the water-temperature dependent EGR-amount correcting action discussed above. As seen in FIG. 14, due to the use of the EGR gas cooling device 9, the density of fresh air introduced into the engine cylinder becomes high. That is, the combustion temperature of the engine can be controlled by way of adjustment of a flow rate of engine coolant flowing through the EGR gas cooling device 9, as well as adjustment of the EGR amount with the EGR system. Also, the increased density of fresh air entering the cylinder (or the combustion chamber), caused by the use of the EGR gas cooling device, acts to advance a point of initiation of ignition. The EGR gas cooling device has both functions of the combustion-temperature control means and the ignition delay duration control means. For the reasons set forth above, during a particular engine operating mode, that is, during high engine speed and load such as an engine speed above 2000 rpm and an engine load or an engine output torque 150 Nm, exhaust emissions are effectively reduced by the additional use of the EGR gas cooling device. Furthermore, as appreciated from right-hand side, comparatively short two solid bars shown in FIG. 14, the use of the EGR gas cooling device contributes to enhancement of a warming-up performance (which is defined as a time-of-arrival at a water temperature of 70° C.) and thus to enhancement of a heating performance of a heater located in the vehicle compartment.

Figure 15:
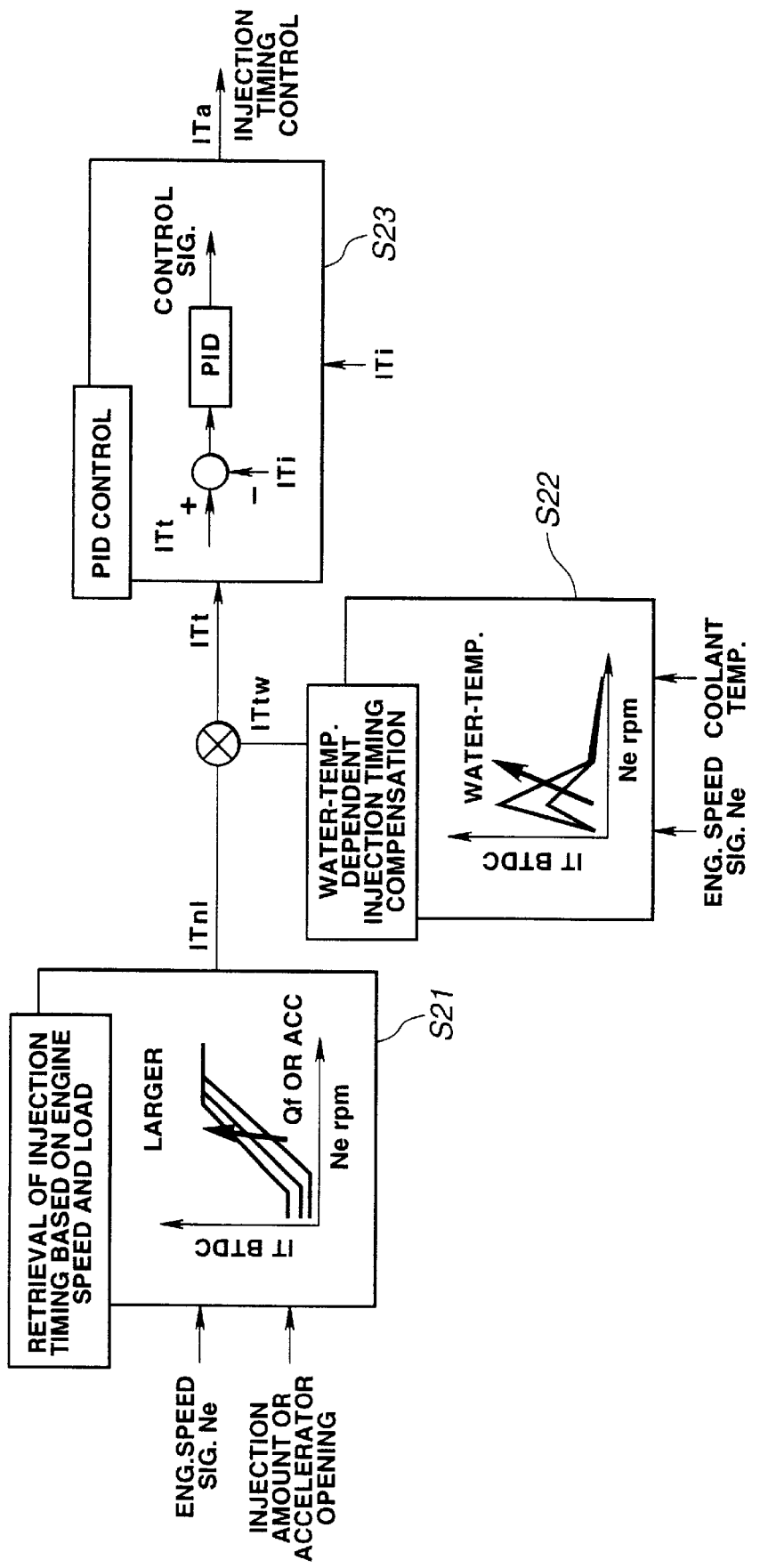
FIG. 15 is a block diagram of a fuel-injection timing control.

FIG. 15 shows the block diagram illustrating the fuel-injection timing control (corresponding to the ignition delay duration control) executed by the diesel-engine control system of the invention. According to the invention, the injection timing control is utilized as an ignition delay duration control, since the ignition delay duration also changes depending upon changes in the injection timing.

In step S21, a target fuel-injection timing ITnl is retrieved from a preprogrammed characteristic map illustrating the relationship among the engine speed Ne, the engine load (estimated by the injection amount Qf (=Qsol) or the accelerator opening ACC), and the target fuel-injection timing IT. Note that the fundamental combustion concept of the present invention is a so-called low-temperature premixed combustion. Hereupon, the term "low-temperature" means a low combustion temperature which is attained by utilization of properly heavy EGR. In the shown embodiment, the increase in the rate of "premixed combustion" to "diffusion combustion" is attained by properly adjusting the fuelinjection timing depending on an engine temperature for example a water temperature (an engine-coolant temperature). When the previously-noted low-temperature premixed combustion (corresponding to the fundamental concept of the invention) is made with respect to a direct-injection diesel engine with an open combustion chamber having a toroidal bowl type cavity, a high-pressure fuel system having a high-pressure distributor type fuel injection pump, and a swirl control device having a high-swirl piston head and a swirl control valve, an optimal injection timing suitable for the engine warm-up period is usually adjusted to a timing (a crank angle) closer to the TDC. As a matter of course, the optimal injection timing is dependent on specifications and types of engines. In step S22, the target injection timing ITnl, retrieved at step 21, is compensated for depending on the water temperature. Concretely, the target injection timing is corrected by a timing-advancement correction amount ITtw in reference to a preprogrammed look-up table indicating the relationship among the water temperature, the engine speed, and the timing-advancement correction amount. Details of the method and effect of the target injection timing based on the water temperature are explained later by reference to FIGS. 16 and 17. As previously described, the injection timing adjustment performed by the fuel-injection timing adjustment means (including the timer piston 30 and the timing control valve 31) is regarded as an ignition delay duration control, because the ignition delay duration can be varied by the injection-timing adjustment. Thus, the injection timing adjustment means (or the injection timing adjustment device) corresponds to the ignition delay duration control means (or the ignition delay duration control device). According to the system of the embodiment, the target fuel-injection timing ITnl is properly corrected by the water-temperature dependent timing-advancement correction amount ITtw through step S22. Thus, the compensating operation of step S22 is regarded as a water-temperature dependent ignition delay duration compensation means. In step S23, the target fuel-injection timing ITt, water-temperature corrected at step S22, is compared with the actual fuel-injection timing ITi detected by the fuel-injector needle valve lift sensor 35. At the same time, in step S23, an injection-timing control signal ITa is determined on the basis of the result of comparison between the two values ITt and ITi, so that the actual injection timing is adjusted toward the target injection timing ITt by way of a proportional plus integral plus derivative control often abbreviated to a "PID control". The injection-timing control signal ITa corresponds to a duty-cycle signal output from the output interface of the control unit 39 to the timing control valve 31.

Figure 16:
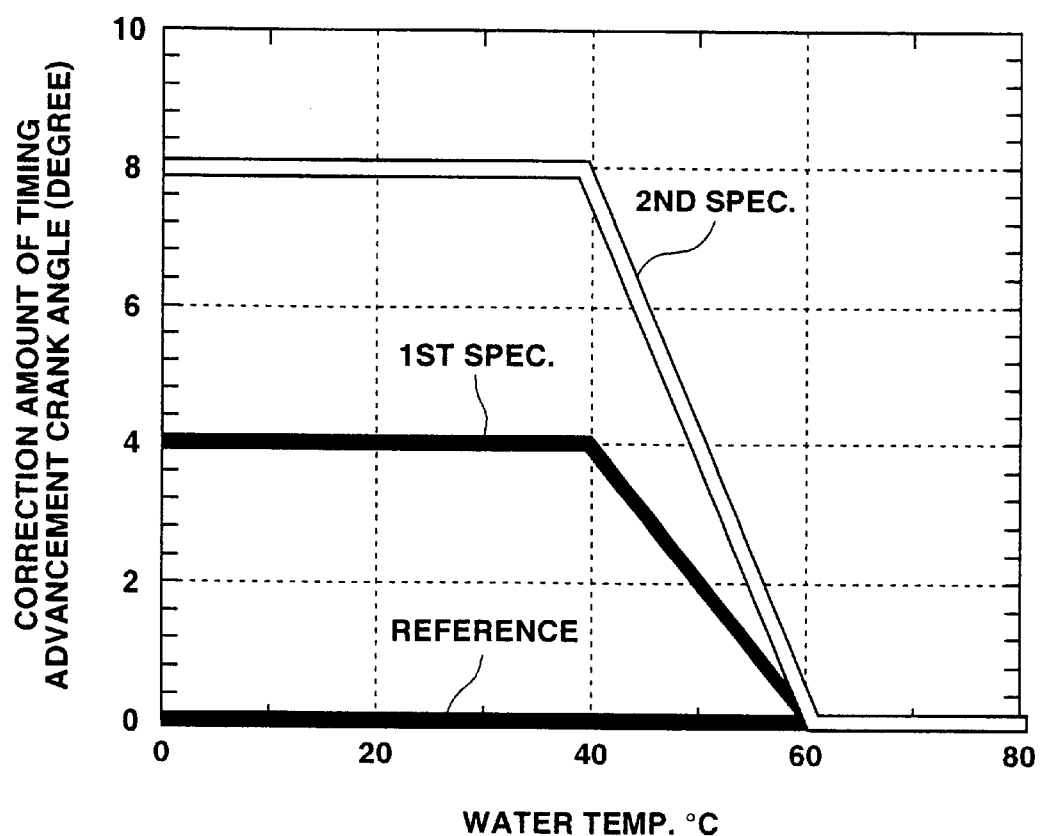
FIG. 16 is a look-up table showing one example of a fuel-injection timing correction table according to which the injection timing is corrected depending upon the water temperature detected.
Figure 17:
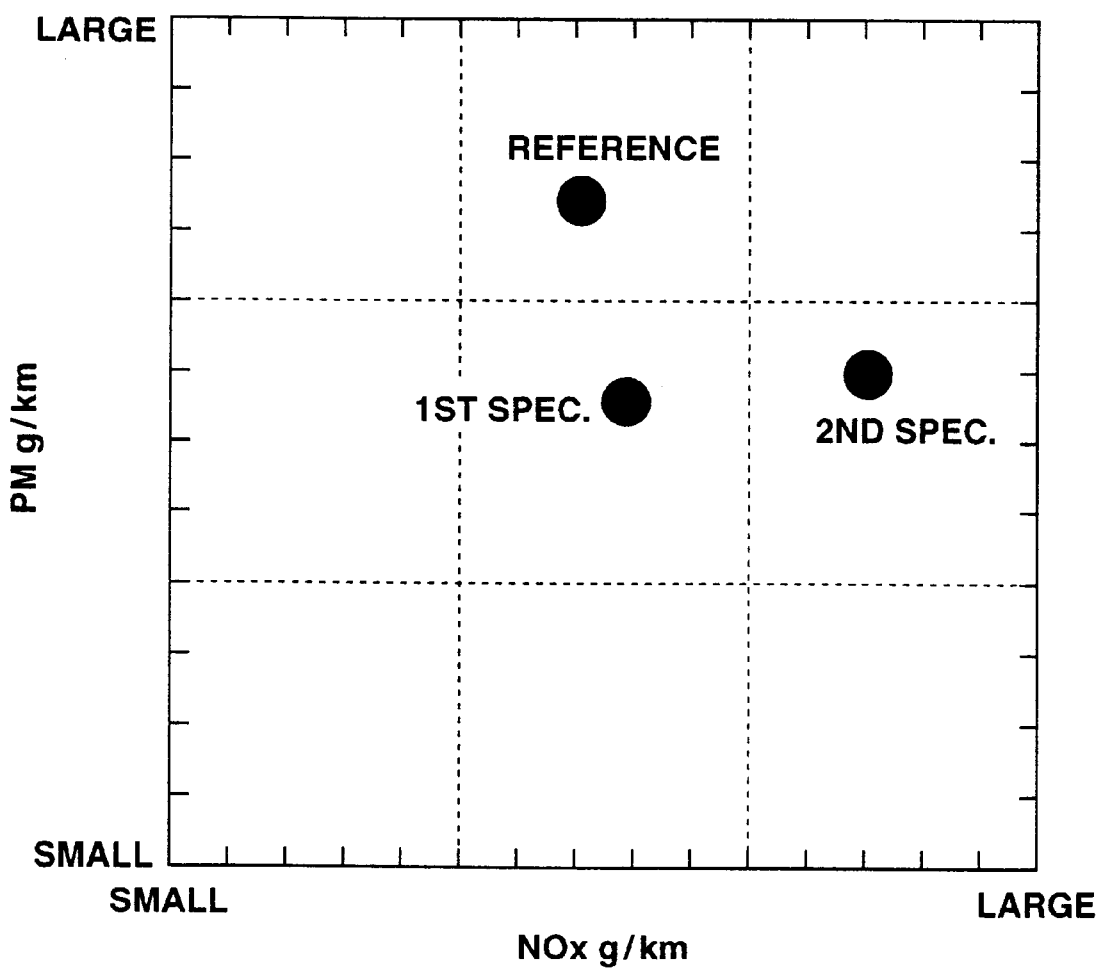
FIG. 17 is a chart showing the relationship between the particulates (PM) level and the $NO_x$ emission level in variations in the water-temperature dependent fuel-injection timing correction.

An example of the water-temperature dependent ignition delay duration compensation look-up table (that is, a low-water-temperature period timing advancement look-up table) related to step S22 of FIG. 15 is shown in FIG. 16. In FIG. 16, a typical water-temperature versus timing-advancement correction amount (represented by a crank angle) characteristic is indicated as "REFERENCE". As seen in FIG. 16, in case of the "REFERENCE" characteristic, any correction is not made to the target fuel-injection timing ITnl (in other wards, the target ignition delay duration) within a comparatively low water-temperature range, that is, during cold-engine start period. On the other hand, in the "1ST SPEC." characteristic, the injection timing is advanced by a crank angle of four degrees before T.D.C. within a low water-temperature range of 0° C. to 40° C. According to the "1ST SPEC." characteristic, the timing-advancement correction amount decreases linearly from four degrees to zero, as the water temperature gradually rises from 40° C. to 60° C. In case of the "2ND SPEC." characteristic, within a low water-temperature range of 0° C. to 40° C., the timing-advancement correction amount is set at a crank angle of eight degrees, thus providing the injection timing advanced by eight degrees before T.D.C. position. In accordance with the timing-advancement correcting operation of the "2ND SPEC." characteristic, the timing-advancement correction amount decreases linearly from eight degrees to zero, as the water temperature gradually rises from 40° C. to 60° C. As may be appreciated from FIG. 16, the degree of timing-advancement correction made according to the "2ND SPEC." characteristic is higher than that of the "1ST SPEC." characteristic over a water-temperature range of 0° C. to 60° C. FIG. 17 shows two exhaust emissions (PM, $NO_x$) in three different operating conditions, that is, the "REFERENCE" characteristic with no timing-advancement correction based on water temperatures, the "1ST SPEC." characteristic with a moderate timing-advancement correction during the low water-temperature period, and the "2ND SPEC." characteristic with a somewhat excessive timing-advancement correction during the low water-temperature period. Simulations shown in FIG. 17 are made with respect to a direct-injection diesel engine with an open combustion chamber having a toroidal bowl type cavity, a high-pressure fuel system, and a swirl control device. As seen in FIG. 17, the "2ND SPEC." characteristic is inferior to the other in lowering $NO_x$ emissions, while the "REFERENCE" characteristic is inferior to the other in lowering PM emissions. From the simulation results shown in FIG. 17, the "1ST SPEC." characteristic is superior to the other in the trade-off relationship between $NO^x$ emissions and PM emissions. Combustion rate wave-forms obtainable by the "REFERENCE", "1ST SPEC.", and "2ND SPEC.", respectively shown in FIG. 16, are hereunder described in detail by reference to FIG. 2. The "REFERENCE" characteristic carries a combustion-rate waveform similar to the right-hand waveform obtained by the conventional DI during the cold engine operation. In other words, the "REFERENCE" characteristic carries the increased rate of incomplete combustion during the cold engine operation, thus increasing unburnt fuel and/or soluble organic substance (SOF). As discussed above, the "REFERENCE" characteristic is ineffective in lowering the PM emissions involving SOF. The "1ST SPEC." characteristic carries the intermediate combustion-rate waveform (the comubustion-rate waveform of the present invention). On the other hand, in the "2ND SPEC." of FIG. 16, owing to a somewhat excessive timing advancement, there is a tendency of an excessively short ignition delay duration. This decreases the rate of "premixed combustion", thus increasing the rate of "diffusion combustion". Therefore, in case of the "2ND SPEC." characteristic, in two different engine operating modes, namely after engine warm-up (see the leftmost waveform shown in FIG. 2) and during engine cold operation (see the rightmost waveform shown in FIG. 2), a combustion-rate waveform almost similar to that of the conventional DI is carried. From the simulation results shown in FIG. 17, the "1ST SPEC." characteristic is superior to the other two specifications, in lowering both $NO_x$ and PM emissions. The previously-described water-temperature versus timing-advancement correction amount characteristic as described in FIG. 16 varies depending on various types and specifications of internal combustion engines. However, it will be easily appreciated that it is possible to determine or select a superior one of a plurality of different water-temperature versus timing-advancement correction amount characteristics from comparison results among combustion-rate waveforms obtained by the respective characteristics.

Figure 18:
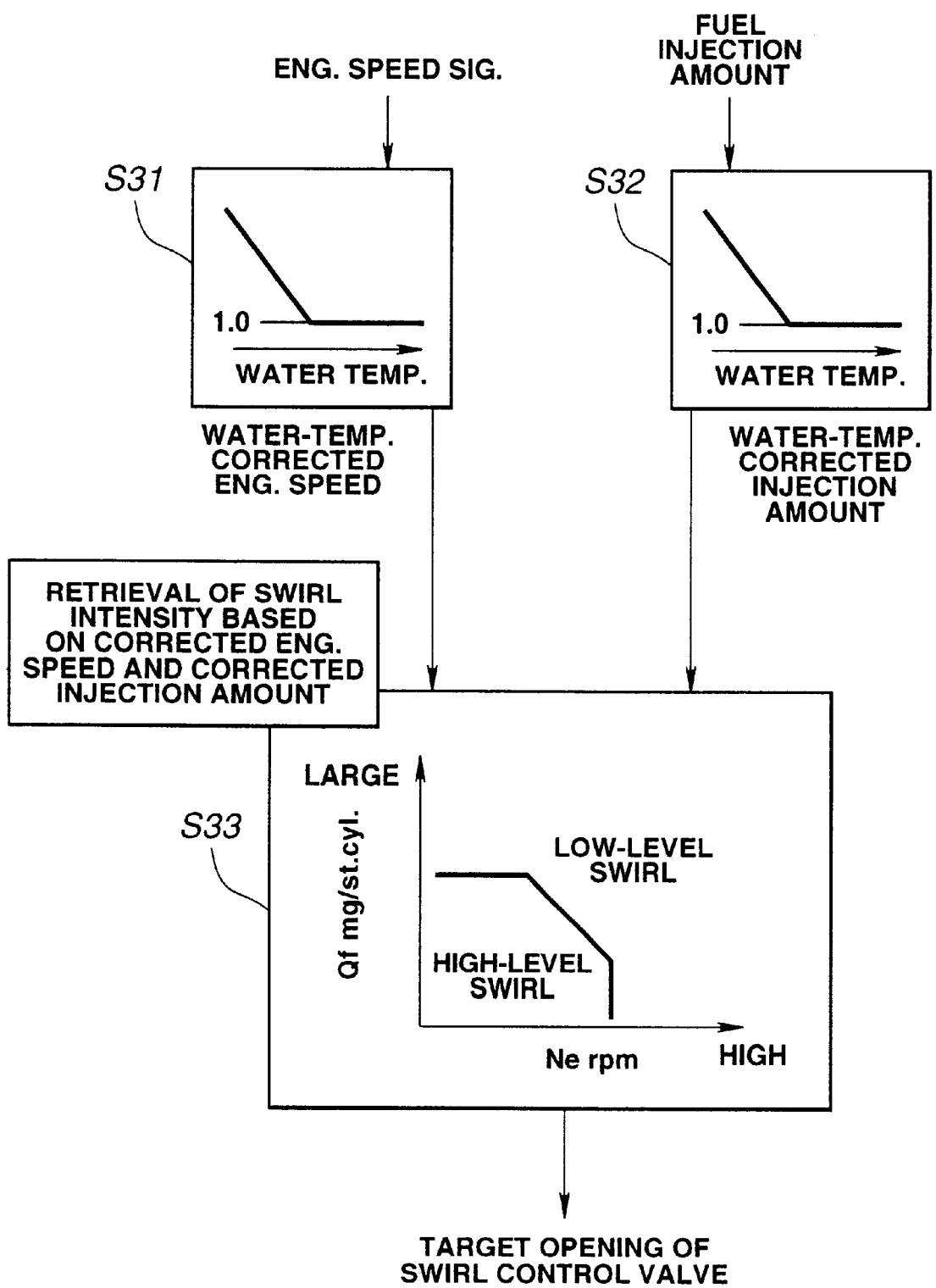
FIG. 18 is a block diagram showing a swirl control.

FIG. 18 shows the block diagram illustrating a swirl control executed by the swirl generating means (comprising the swirl control valve 10) incorporated in the diesel-engine control system of the invention.

Figure 19A:
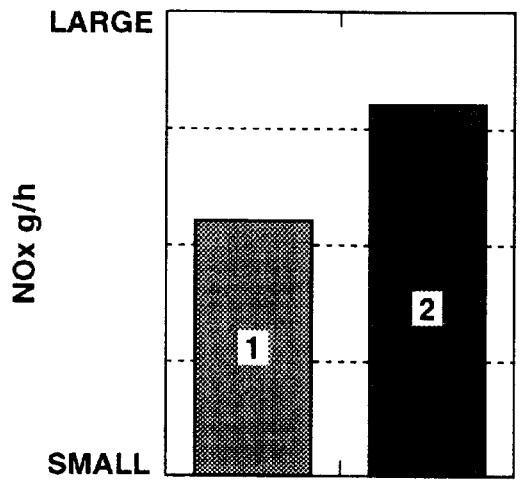
FIGS. 19A–19D are bar graphs showing the relationship between the water-temperature dependent swirl intensity and levels of various exhaust emissions, namely $NO_x$, PM, HC, and CO.
Figure 19B:
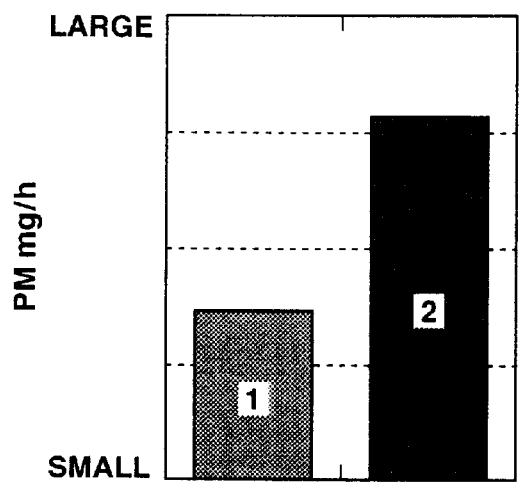
Figure 19C:
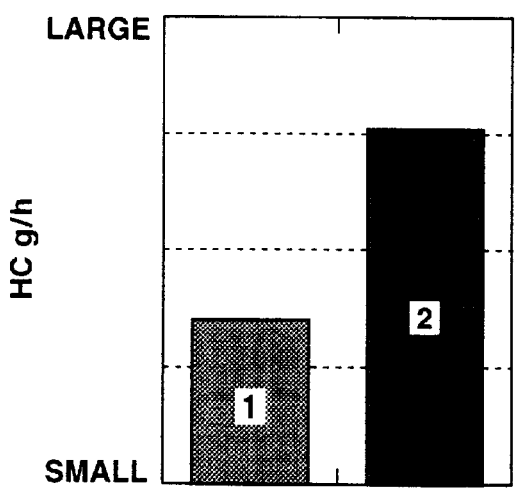
Figure 19D:
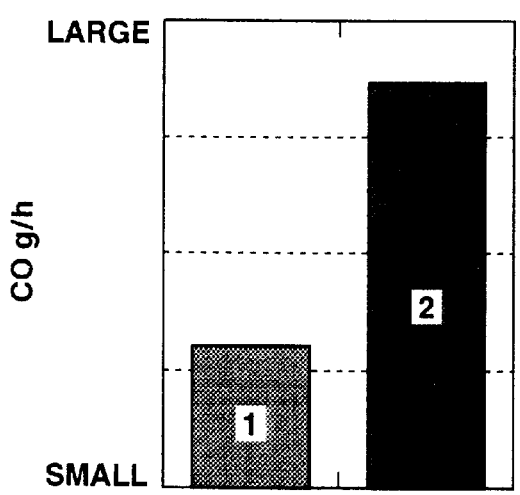
Figure 20:
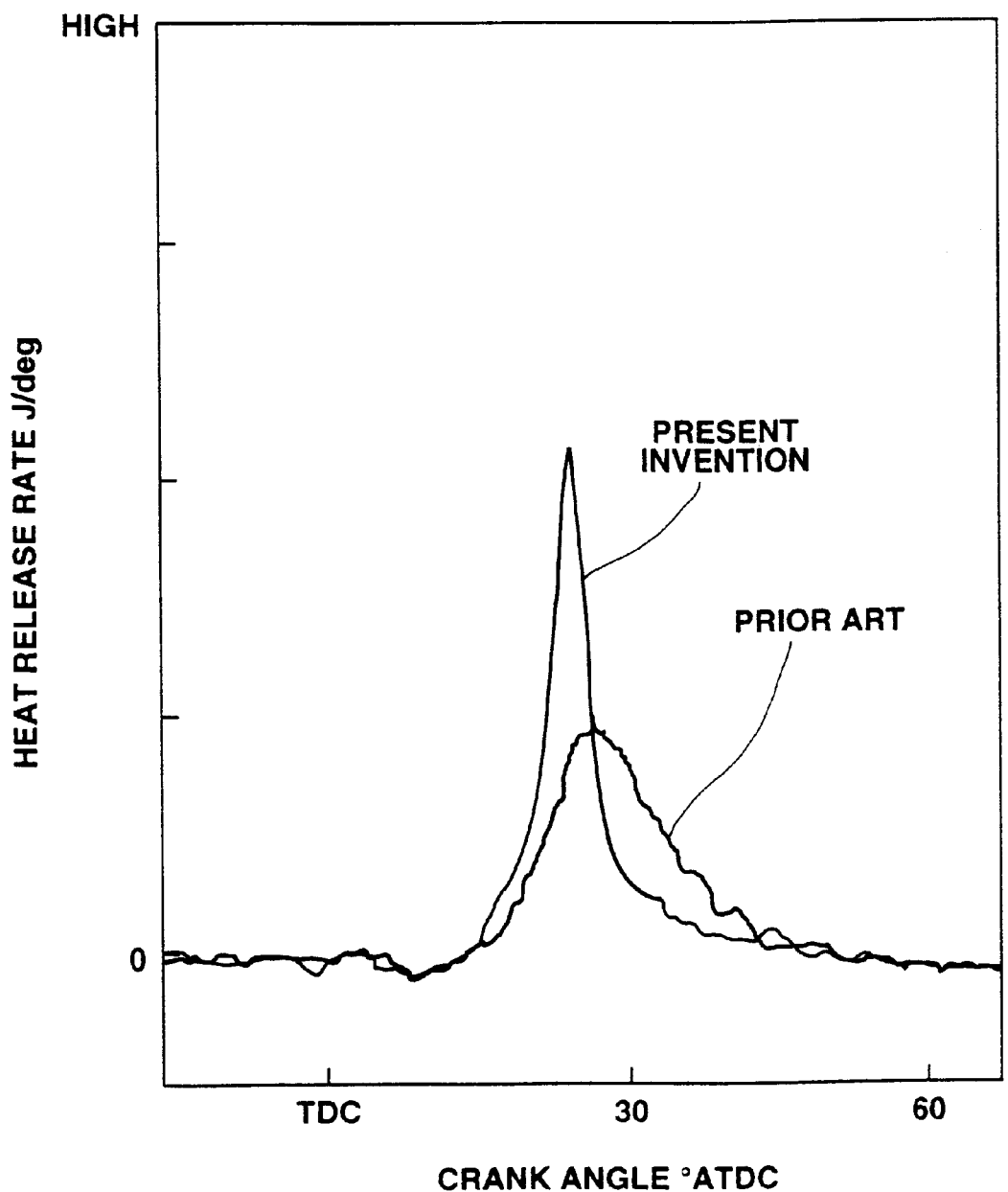
FIG. 20 is a graph illustrating the difference of the heat release rate (unit: J/deg) between the present invention in which the water-temperature dependent EGR correction and the water-temperature dependent injection timing correction are both made, and the prior art.
Figure 21:
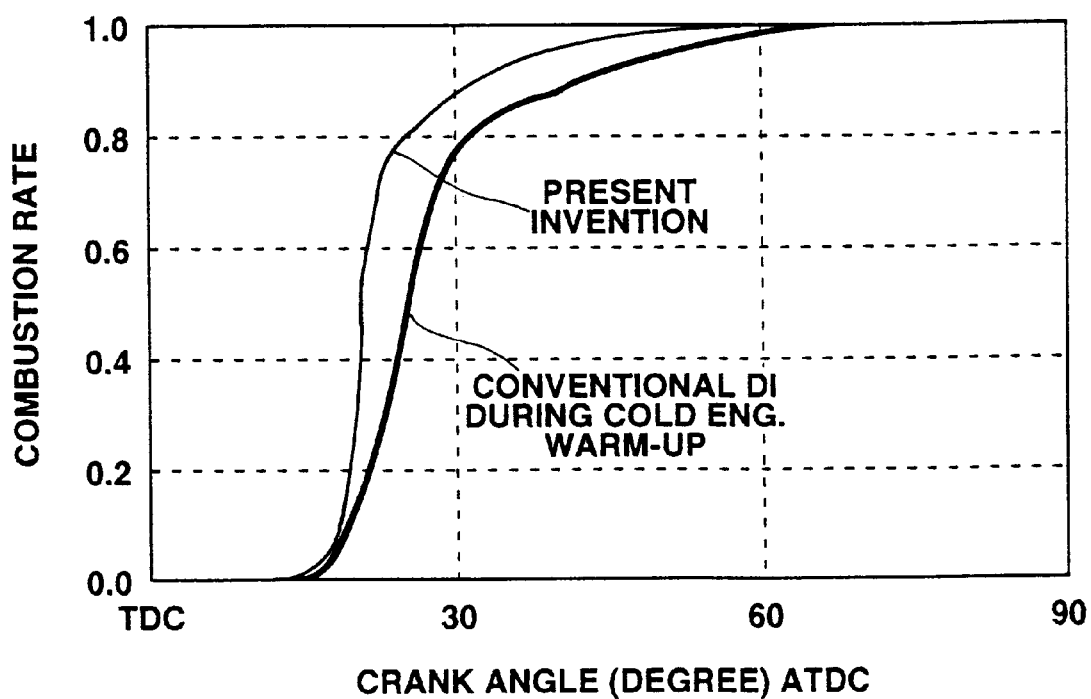
FIG. 21 is a graph illustrating the relationship between the combustion rate and the crank angle after TDC, in the direct-injection diesel engine of the present invention during the cold-engine warm-up period and the usual direct-injection diesel engine during the cold-engine warm-up period.
Figure 22A:
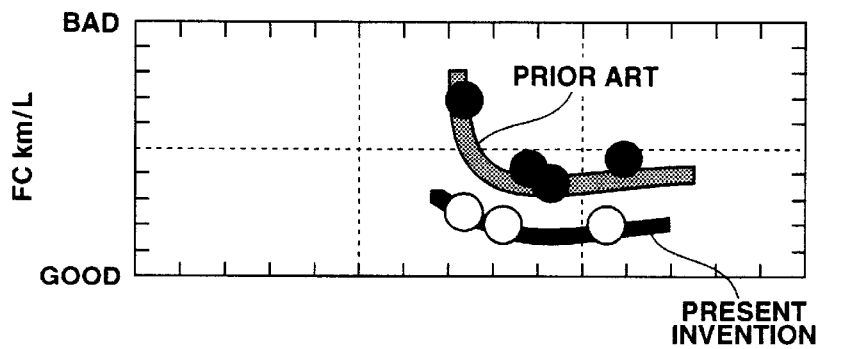
FIGS. 22A and 22B are charts respectively illustrating the relationship between the fuel consumption (FC) and the $NO_x$ level, and the relationship between the particulates (PM) level and the $NO_x$ level.
Figure 22B:
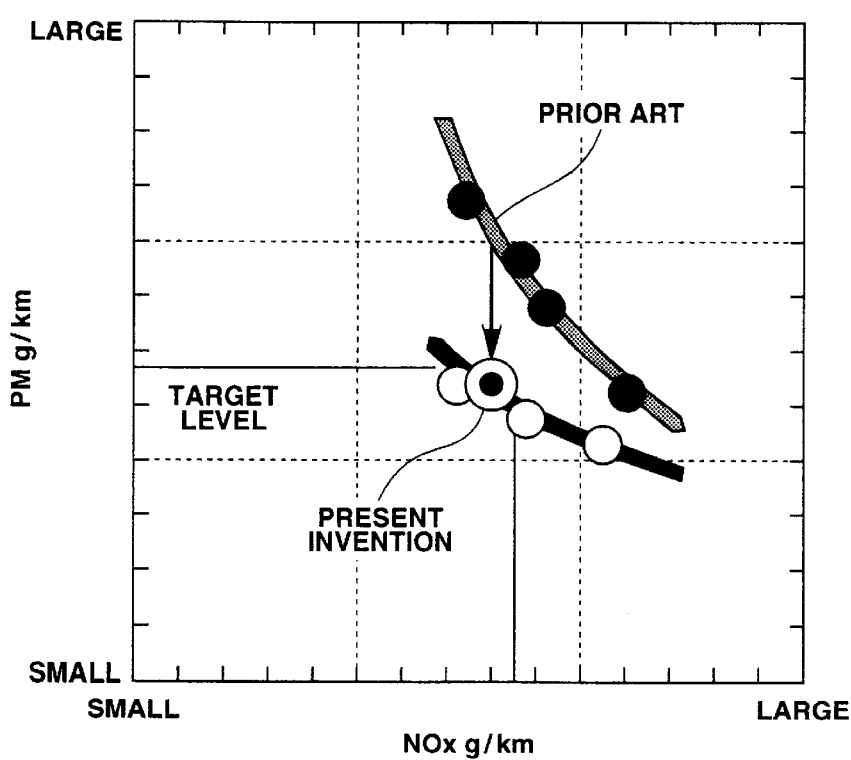

In step S31, the engine-speed indicative input data Ne detectable by the engine speed sensor 32 is corrected depending on the water temperature measured by the water temperature sensor 36. Actually, a water-temperature dependent correction factor for the engine speed Ne is retrieved from a preprogrammed look-up table as indicated in step S31 of the block diagram shown in FIG. 18. As appreciated from the water-temperature versus engine-speed correction factor characteristic curve shown in step S31, the correction factor increases substantially linearly from low to high (e.g., 1.0), as the water temperature gradually rises to a predetermined temperature value. At water temperatures above the predetermined temperature value, the correction factor remains fixed at "1.0". In step S32, the engine-load indicative input data Qf (estimated by the fuel injection amount Qsol) is corrected depending on the water temperature measured by the water temperature sensor 36. Actually, a water-temperature dependent correction factor for the engine load (Qf) is retrieved from a preprogrammed look-up table as indicated in step S32 of the block diagram shown in FIG. 18. As appreciated from the water-temperature versus engine-load correction factor characteristic curve shown in step S32, the engine-load correction factor characteristic of S32 is similar to that of step S31. For example, in step S31, the engine-speed indicative data Ne is corrected depending on the sensed water temperature, by multiplying the engine-speed indicative data Ne by the correction factor retrieved from the look-up table of S31. Likewise, in step S32, the engine-load indicative data (Qf) is corrected depending on the sensed water temperature, by multiplying the engine-load indicative data (Qf) by the correction factor retrieved from the look-up table of S32. Thus, the water-temperature corrected engine speed produced through step S31 and the water-temperature corrected engine load produced through step S32 respectively tend to become below the engine-speed indicative input data Ne and the engine-load indicative input data (Qf) within a low water-temperature range below the predetermined temperature value. In other words, during the cold engine operation at low engine temperatures (at low water temperatures), the engine speed and load are both corrected below. In step S33, a target valve opening of the swirl control valve 10 (that is, a swirl intensity) is retrieved from a preprogrammed look-up table or map shown in the block corresponding to step S33, on the basis of the water-temperature corrected engine speed retrieved at step S31 and the water-temperature corrected engine load retrieved at step S32. A control command indicative of the target swirl-control-valve opening is then output from the output interface of the control unit to the swirl control valve 10. In this manner, the swirl control valve opening is properly corrected depending upon the water temperature. As can be appreciated from the three look-up tables shown in steps S31, S32 and S33 of FIG. 18, the downward correction of the engine speed and load, executed during the low engine temperature period (or during the low water temperature period such as during engine cold start), practically means enlargement of a high-level swirl zone (in other words, contraction of a low-level swirl zone) indicated in the block corresponding to step S33. These characteristics indicated in steps S31, S32 and S33 vary depending on types and specifications of internal combustion engines. In the embodiment, although the correction-factor characteristic of S31 is similar to that of S32, the correction-factor characteristic of S31 related with engine speed may be different from the correction-factor characteristic of S32 related with engine load, so as to properly change a boundary line between a high-level swirl zone and a low-level swirl zone depending on types and specifications of engines. Thereafter, in step S33, a control signal representative of the target opening of the swirl control valve 10 is output from the output interface of the control unit 39 to an actuator of the swirl control valve. Steps S31 and S32 cooperate with each other to function as a water-temperature dependent swirl-intensity compensation means. FIGS. 19A through 19D show test results of various exhaust emissions, namely $NO_x$, PM, HC, and CO, in the presence and absence of the water-temperature dependent swirl control valve opening correction shown in FIG. 18. In the bar graphs shown in FIGS. 19A, 19B, 19C, and 19D, the solid bar denoted by "2" corresponds to the absence of the water-temperature dependent swirl control valve opening correction shown in FIG. 18, whereas the half-tone dot meshing bar denoted by "1" corresponds to the presence of the water-temperature dependent swirl control valve opening correction. According to the swirl control valve opening control (the swirl intensity control) of the invention, the high-level swirl zone is enlarged during the engine cold operation (at low engine temperatures or at low water temperatures), than with a high-level swirl zone set after the engine warming-up. Thus, the diesel engine of the invention can produce powerful swirl flow in the combustion chamber during the low water-temperature period. Although there is a tendency for an ignition delay duration to lengthen during the low water-temperature period, the ignition delay duration can be optimized by a low water-temperature period strong swirl flow realized by virtue of the swirl control shown in FIG. 18. Thus, as seen in the combustion-rate waveforms shown in FIG. 2, the combustion center midway between the start of combustion and the completion of combustion tends to approach from the combustion-rate waveform of conventional DI obtained during the cold engine operation to the intermediate combustion-rate waveform of the present invention. As seen in FIGS. 19A–19D, the low water-temperature swirl intensity correction is effective in lowering all of $NO_x$, PM, HC, and CO emissions. FIGS. 20 and 21 respectively show the crank angle (degree) versus heat release rate (Joule/degree) characteristics and the combustion-rate waveforms, in the direct-injection diesel engine of the present invention (in the presence of the three water-temperature dependent corrections, that is, the water-temperature dependent EGR correction shown in FIG. 11, the water-temperature dependent injection timing correction shown in FIG. 15, and the swirl intensity correction shown in FIG. 18) and the conventional DI (with no water-temperature dependent corrections). The combustion-rate waveforms shown in FIG. 21 are obtainable by integration of the respective crank-angle versus heat-release-rate characteristics shown in FIG. 22. In other words, the gradient of each of the waveforms of FIG. 21, which gradient is the rate of change of the combustion rate with respect to the crank angle, corresponds to the heat release rate indicated in FIG. 20. That is to say, in FIG. 20, the heat release rate (J/deg) means a calorific value generated at unit crank angle. As can be appreciated from the gently-sloping waveform shown in FIG. 21 or the gently-sloping heat release rate characteristic shown in FIG. 20 until the crank angle of fifteen degrees after TDC, the system of the embodiment ensures a slow initial combustion in the early combustion stage. Additionally, as can be appreciated from the steeply-sloping waveform shown in FIG. 21 or the steeply-sloping heat release rate characteristic shown in FIG. 20 within the crank angle range between fifteen degrees and twenty-three degrees after TDC, the system of the embodiment ensures a sharp combustion in the middle combustion stage. That is, the system of the embodiment reconciles both the slow initial combustion in the early combustion stage and the sharp combustion in the middle or later combustion stage even during the cold-engine warm-up period, by properly controlling both the combustion temperature and the ignition delay duration by virtue of the water-temperature dependent EGR correction (the engine-temperature dependent EGR correction), the watertemperature dependent injection timing correction (the engine-temperature dependent injection timing correction), and the water-temperature dependent swirl intensity correction (the engine-temperature dependent swirl intensity correction). FIGS. 22A and 22B respectively show the $NO_x$ versus fuel consumption characteristic curve and the $NO_x$ versus particulate matter (PM) characteristic curve, in the so-called low-temperature premixed combustion concept of the present invention providing the improved combustion process shown in FIGS. 20 and 21, and the conventional combustion concept. As seen in the test results of FIGS. 22A and 22B, the low-temperature premixed combustion concept of the present invention is superior to the conventional combustion concept in lowering the $NO_x$ and PM emissions and in improving fuel economy. Furthermore, the low-temperature premixed combustion concept of the present invention is superior in lowering HC and CO emissions to the conventional combustion concept, as seen in FIGS. 19C and 19D. Thus, the system of the invention can largely reduce white smoke during the low water-temperature engine cold operation.

In the previously-explained embodiment, the EGR system is used as the combustion temperature control means. Alternatively, it will be appreciated that a portion of the intake-air passage in the induction system may be constructed by an oxygen permeable membrane to properly reduce the oxygen content of fresh air entering the engine cylinder.

Figure 1:
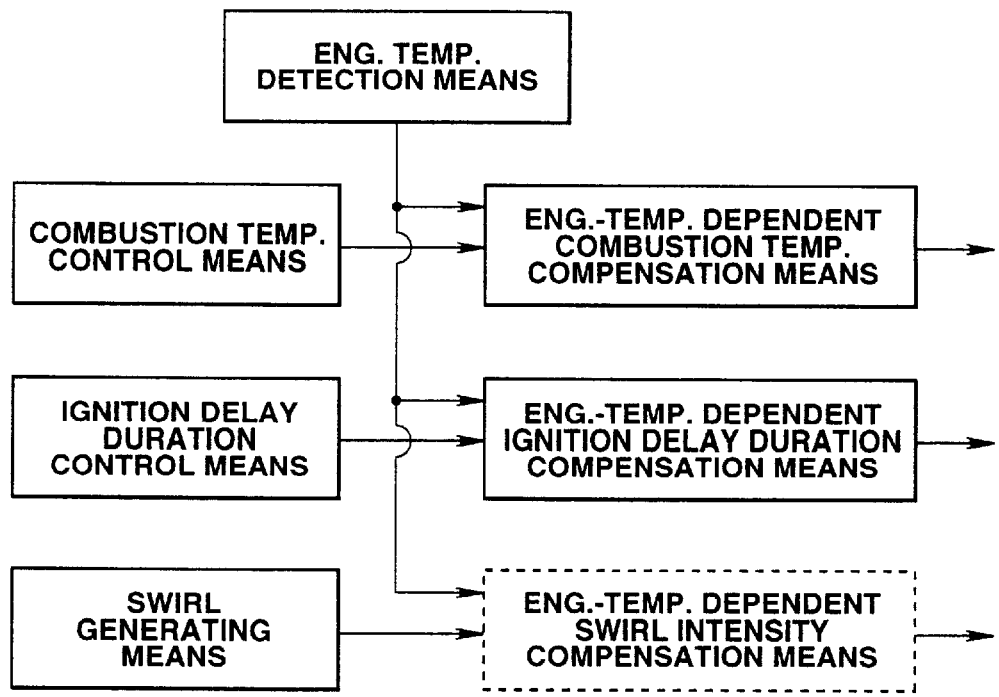
FIG. 1 is a block diagram illustrating the fundamental construction of the present invention.
Figure 2:
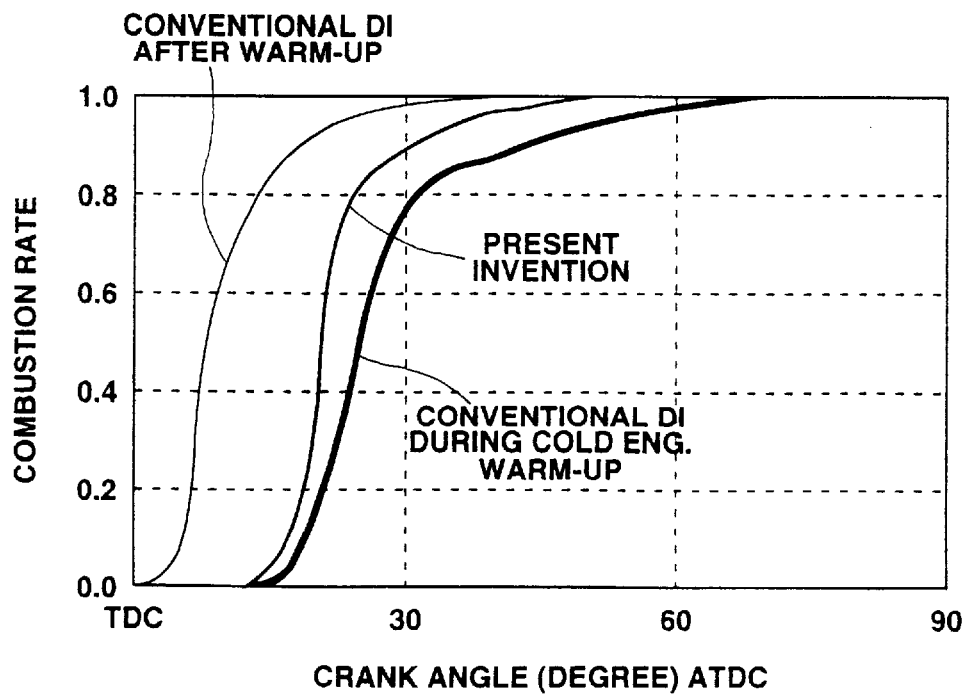
FIG. 2 is a graph illustrating the relationship between the combustion rate and the crank angle after TDC, comparing among the characteristic of the direct-injection diesel engine of the present invention during cold-engine warm-up period, the characteristic of the usual direct-injection diesel engine after engine warm-up, and the characteristic of the usual direct-injection diesel engine during cold-engine warm-up period.
Figure 3:
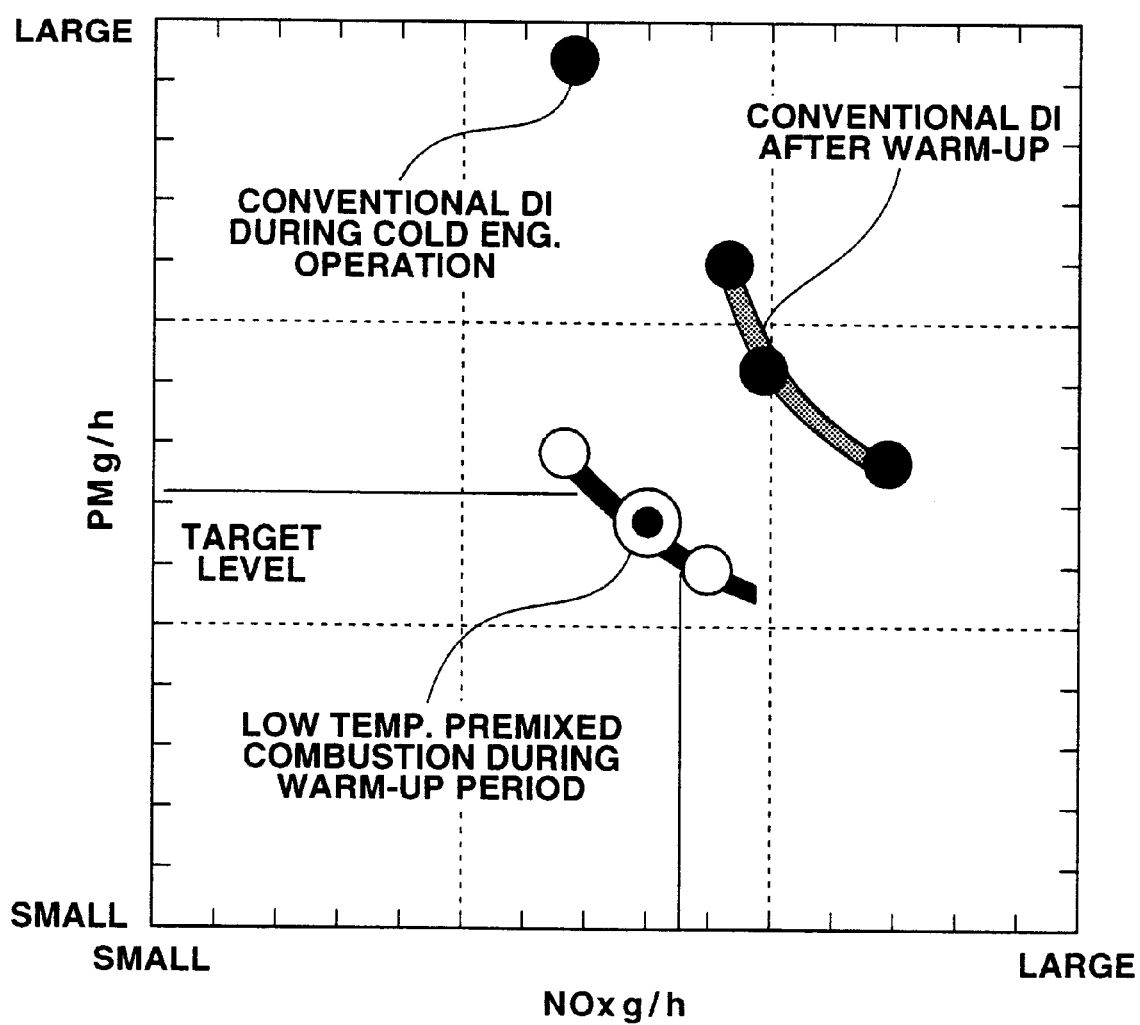
FIG. 3 is a chart showing the relationship between the particulate-matter level (the exhaust smoke level) and the $NO_x$ emission level in the direct-injection diesel engine of the present invention during the cold-engine warm-up period, the usual direct-injection diesel engine after the engine warm-up, and the usual direct-injection diesel engine during the cold-engine warm-up period.

Referring now to FIG. 1, there is shown the fundamental construction of the diesel-engine control system according to the invention. As seen in FIG. 1, the diesel-engine control system of the invention comprises a combustion-temperature control means (or a combustion-temperature control device) which adjusts a combustion temperature of the engine depending on an operating condition of the engine, an ignition-delay-duration control means (or an ignition-delay-duration control device) which adjusts an ignition delay duration of diesel fuel depending on the engine operating condition, a swirl generating means (or a swirl generating device) which generates a controlled swirl flow in a combustion chamber, and an engine temperature detection means for detecting an engine temperature (e.g., an engine coolant temperature or an engine oil temperature). Also provided are an engine-temperature dependent combustion-temperature compensation means (or a combustion-temperature compensator) and an engine-temperature dependent ignition-delay-duration compensation means (or an ignition-delay-duration compensator). The engine-temperature dependent combustion-temperature compensation means receives an engine-temperature indicative signal from the engine-temperature detection means and a combustion temperature indicative output data from the combustion-temperature control means, for compensating for the combustion temperature, during a cold-engine warm-up period, depending on the engine temperature detected and for generating an engine-temperature dependent combustion-temperature control command based on the engine temperature so that the combustion temperature to be adjusted by the combustion temperature control means is feedback-controlled in response to the engine-temperature dependent combustion-temperature control command. The engine-temperature dependent ignition-delay-duration compensation means receives the engine-temperature indicative signal from the engine-temperature detection means and an ignition delay duration indicative output data from the ignition-delay-duration control means, for compensating for the ignition delay duration, during the cold-engine warm-up period, depending on the engine temperature and for generating an engine-temperature dependent ignition-delay-duration control command based on the engine temperature so that the ignition delay duration to be adjusted by the ignition-delay-duration control means is feedback-controlled in response to the engine-temperature dependent ignition delay duration control command. With the fundamental construction discussed above, the diesel-engine control system of the invention assures an improved combustion process shown in FIG. 2. As previously explained, FIG. 2 shows comparison results among the combustion-rate waveform obtained in the conventional DI afterwarm-up (see the left-hand-waveform of FIG. 2), the combustion-rate waveform based on the fundamental concept of the direct-injection diesel engine of the present invention during cold-engine warming-up period, and the combustion-rate waveform obtained in the conventional DI during cold-engine warming-up period. As can be appreciated from the left-hand combustion-rate waveform, in case of the conventional DI after the warm-up, a timing of the start of combustion is earliest. That is, in the early combustion stage, the heat release rate rises rapidly. During the combustion duration from the middle to end combustion stage the combustion develops in the form of diffusion combustion, and then the diffusion combustion ends at a crank angle near forty degrees after TDC. On the contrary, in the fundamental concept of the invention (the previously-noted low-temperature premixed combustion process) according to which, during the cold-engine warming-up period, the ignition delay duration is extended so as to lower the combustion temperature and thus the rate of "premixed combustion" to "diffusion combustion" is increased, a slow initial combustion occurs until a crank angle near fifteen degrees after TDC. Then, a sharp middle-stage combustion follows the slow initial combustion stage. In case of the direct-injection diesel engine of the invention, the combustion ends at a timing close to the completion of combustion in the left-hand combustion process obtained in the conventional DI after warm-up, rather than the completion of combustion in the right-hand combustion process obtained in the conventional DI during cold-engine warming-up period. On the other hand, in case of the combustion process obtained by the conventional DI during the cold-engine warming-up period, it will be seen that the center of combustion between the start of combustion and the completion of combustion is retarded as compared with the other combustion processes, since the ignition delay duration tends to become excessively longer due to an increased cooling loss resulting from a lower cylinder wall temperature (or a lower combustion-chamber wall temperature). FIG. 3 shows the relationship between the $NO_x$ emissions and particulate matter (PM) emissions, in the fundamental combustion concept (the low-temperature premixed combustion process) of the invention and the conventional combustion concept (the combustion process mainly composed of the diffusion combustion). As seen in FIG. 3, in the low-temperature premixed combustion concept of the invention, the trade-off relationship between $NO_x$ emissions and PM emissions can be greatly improved in comparison with the conventional DI after warm-up and during cold engine operation. Under the same condition (the same engine load) as the low-temperature premixed combustion of the present invention, the $NO_x$ emissions obtained by the conventional DI during cold engine operation is comparatively low since the ignition delay duration is increased during the cold engine operation and thus the center of combustion tends to be retarded. However, owing to the increased rate of incomplete combustion during cold engine operation, unburnt fuel and/or soluble organic substance (SOF) tends to increase, thus remarkably increasing the PM emissions. From the viewpoint of improvement of the trade-off relationship between $NO_x$ and PM and improvement of fuel economy during cold-engine warm-up period and to ensure stable combustion during the cold-engine warm-up period, it is effective to properly control or adjust both the combustion temperature and the ignition delay duration in order to reconcile the slow initial combustion in the early combustion stage and the sharp combustion in the middle or later combustion stage.

Returning to FIG. 1, the diesel-engine control system of the invention may further comprise a swirl generating means (or a swirl generating device)for generating or creating a controlled swirl motion in the combustion chamber, and an engine-temperature dependent swirl-intensity compensation means (or a swirl-intensity compensator). As indicated by the broken line of FIG. 1, the engine-temperature dependent swirl-intensity compensation means receives the engine-temperature indicative signal from the engine-temperature detection means and a swirl intensity indicative output data from the swirl generating means, for compensating for the swirl intensity depending on the engine temperature and for generating an enginetemperature dependent swirl-intensity control command based on the engine temperature so that the intensity of swirl motion created by the swirl generating means is feedback-controlled depending on the engine-temperature dependent swirl-intensity control command. As previously described, the combustion-temperature control means can be easily realized by utilizing a typical EGR system, that is, by way of adjustment of the EGR amount. Also, the ignition-delay-duration control means can be easily realized by utilizing a typical fuel-injection timing adjusting device. The system of the invention may further comprise an EGR gas cooling device. The additional use of the EGR gas cooling device enhances the density of fresh air entering the engine cylinder. Thus, the EGR gas cooling device cooperates with the EGR system, to thoroughly reduce exhaust emissions involving $NO_x$ and PM emissions during the cold-engine warm-up period and also to improve a heating performance of a heater during warming-up period. The provision of the engine-temperature dependent swirl-intensity compensation means results in an enlarged high-level swirl zone by varying the low/high swirl zone boundary line based on engine speed and load at low engine temperatures below a predetermined low temperature value (that is, during cold-engine warm-up period). Thus, during low engine temperatures (at low engine coolant temperatures), the intensity of swirl motion tends to become high. This effectively reduces exhaust emissions even during the cold-engine warm-up period.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A diesel engine comprising:
   a sensor for detecting an engine temperature;
   a combustion-temperature control device which adjusts a combustion temperature of the engine depending on engine speed, engine load, and the engine temperature detected by the sensor; and
   an ignition-delay-duration control device which adjusts an ignition delay duration depending on the engine speed, the engine load, and the engine temperature detected by the sensor, and said ignition delay duration being defined as a time duration between a start of fuel-injection and a start of ignition.

2. The diesel engine as claimed in claim 1, wherein said combustion-temperature control device comprises an exhaust gas recirculation system.

3. The diesel engine as claimed in claim 2, wherein said exhaust gas recirculation system comprises:
   an exhaust-gas-recirculation passage interconnecting an intake-air passage and an exhaust-gas passage;
   an exhaust-gas-recirculation valve which adjusts an amount of exhaust gases recirculated through the exhaust-gas-recirculation passage; and
   a processor programmed to perform the following,
      (a) calculating a target exhaust-gas-recirculation valve opening of the exhaust-gas-recirculation valve based on the engine speed and the engine load;
      (b) compensating for the target exhaust-gas-recirculation valve opening based on the engine temperature; and
      (c) controlling the exhaust-gas-recirculation valve based on the compensated target exhaust-gas-recirculation valve opening.

4. The diesel engine as claimed in claim 3, wherein said processor is further programmed for:
   (d) decreasingly compensating for the target exhaust-gas-recirculation valve opening as the engine temperature decreases, when the engine temperature is below a predetermined temperature.

5. The diesel engine as claimed in claim 3, wherein said ignition-delay-duration control device comprises a swirl generating device for generating a controlled swirl flow in a combustion chamber of the engine.

6. The diesel engine as claimed in claim 5, wherein said swirl generating device comprises:
   a swirl control valve which adjusts a swirl intensity of the controlled swirl flow generated in the combustion chamber of the engine; and
   a processor programmed to perform the following,
      (a) calculating an engine-temperature corrected engine speed by compensating for the engine speed by the engine temperature;
      (b) calculating an engine-temperature corrected engine load by compensating for the engine load by the engine temperature;
      (c) calculating a target swirl-control-valve opening of the swirl control valve based on the engine-temperature corrected engine speed and the engine-temperature corrected engine load; and
      (d) controlling the swirl control valve based on the calculated target swirl-control-valve opening.

7. The diesel engine as claimed in claim 6, wherein said processor is further programmed for:
(e) calculating the engine-temperature dependent engine speed by decreasingly compensating for the engine speed as the engine temperature decreases, when the engine temperature is below a predetermined temperature;
(f) calculating the engine-temperature dependent engine load by decreasingly compensating for the engine load as the engine temperature decreases, when the engine temperature is below the predetermined temperature;
(g) calculating the target swirl-control-valve opening that produces a high-level swirl flow, when a condition where the engine-temperature dependent engine sped is below a predetermined engine speed and a condition where the engine-temperature dependent engine load is below a predetermined engine load are simultaneously satisfied; and
(h) calculating the target swirl-control-valve opening that produces a low-level swirl flow, when one of a condition where the engine-temperature dependent engine speed is above the predetermined engine speed and a condition where the engine-temperature dependent engine load is above the predetermined engine load is satisfied.

8. The diesel engine as claimed in claim 1, wherein said ignition-delay-duration control device comprises a fuel-injection timing adjustment device.

9. The diesel engine as claimed in claim 8, which further comprises an electronic fuel-injection system having a fuel injector, and wherein said fuel-injection timing adjustment device comprises a processor programmed to perform the following:
(a) calculating a target fuel-injection timing based on the engine speed and the engine load;
(b) compensating for the target fuel-injection timing based on the engine temperature; and
(c) controlling the fuel injector based on the compensated target fuel-injection timing.

10. The diesel engine as claimed in claim 9, wherein said processor is further programmed for:
(d) compensating for the target fuel-injection timing so that the target fuel-injection timing is advanced as the engine temperature decreases, when the engine temperature is below a predetermined temperature.

11. The diesel engine as claimed in claim 1, which further comprises an exhaust-gas-recirculation gas cooling device which cools part of exhaust gases sent back through the engine.

12. The diesel engine as claimed in claim 1, wherein the sensor comprises a water-temperature sensor which detects a temperature of engine coolant.

* * * * *